United States Patent
Kishima et al.

(10) Patent No.: US 10,913,501 B2
(45) Date of Patent: Feb. 9, 2021

(54) VEHICLE UNDERSTRUCTURE

(71) Applicant: TOYOTA JIDOSHA KABUSHIKI KAISHA, Toyota (JP)

(72) Inventors: Fumihiko Kishima, Konan (JP); Koji Tokuyama, Nishio (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/008,406

(22) Filed: Jun. 14, 2018

(65) Prior Publication Data

US 2018/0362102 A1  Dec. 20, 2018

(30) Foreign Application Priority Data

Jun. 19, 2017  (JP) .................................. 2017-119801

(51) Int. Cl.
*B62D 35/02* (2006.01)
*B62D 25/18* (2006.01)
*B62D 35/00* (2006.01)

(52) U.S. Cl.
CPC ............. *B62D 35/02* (2013.01); *B62D 25/18* (2013.01); *B62D 35/005* (2013.01)

(58) Field of Classification Search
CPC .... B62D 35/02; B62D 35/005; B62D 35/007; B62D 25/008; B62D 25/18; B62D 25/16; B62D 25/161; B62D 25/168; B62D 25/188; B62D 37/02
USPC ...... 296/180.1; 293/117; 280/847, 848, 851, 280/159
See application file for complete search history.

(56) References Cited

U.S. PATENT DOCUMENTS

| | | | | |
|---|---|---|---|---|
| 4,402,537 A | * | 9/1983 | Gallitzendorfer | B60R 19/04 293/149 |
| 5,322,340 A | * | 6/1994 | Sato | B62D 25/20 180/68.1 |
| 5,511,847 A | * | 4/1996 | Weisbarth | B60C 23/18 296/180.1 |
| 6,260,911 B1 | * | 7/2001 | Becker | B62D 35/005 296/180.2 |
| 7,055,638 B2 | * | 6/2006 | Khalighi | B62D 35/005 180/116 |

(Continued)

FOREIGN PATENT DOCUMENTS

| | | | | |
|---|---|---|---|---|
| EP | 2879940 B1 | * | 2/2017 | ............. B62D 25/18 |
| JP | 2003-003838 A | | 1/2003 | |

(Continued)

*Primary Examiner* — Dennis H Pedder
(74) *Attorney, Agent, or Firm* — Oliff PLC

(57) ABSTRACT

A vehicle understructure includes a flow adjusting member provided rearward of a protruding member protruding further toward a vehicle lower side than a lower surface of a rocker panel, a front bumper, or a rear bumper as viewed from a vehicle width direction, the flow adjusting member being configured to adjust an air flow that flows from a vehicle front side toward a vehicle rear side along the protruding member during traveling of a vehicle. The flow adjusting member has a main part and a guide part provided at a lower part of an end part of the flow adjusting member, the guide part being inclined with respect to the main part toward the vehicle rear side such that a distance between the guide part and a rear end of the vehicle reduces toward an end part of the guide part in the vehicle width direction.

13 Claims, 22 Drawing Sheets

(56) References Cited

U.S. PATENT DOCUMENTS

| | | | | |
|---|---|---|---|---|
| 7,198,322 B2* | 4/2007 | Savo | ................... | B62D 35/005 |
| | | | | 296/180.5 |
| 8,276,973 B2* | 10/2012 | Hasegawa | .............. | B62D 25/16 |
| | | | | 296/180.1 |
| 8,517,451 B2* | 8/2013 | Kakiuchi | ............... | B62D 35/02 |
| | | | | 296/180.1 |
| 8,668,245 B2* | 3/2014 | Kakiuchi | ............... | B62D 35/02 |
| | | | | 296/180.1 |
| 9,637,185 B2* | 5/2017 | Kishima | ............... | B62D 25/08 |
| 9,926,021 B2* | 3/2018 | Han | ....................... | B62D 35/02 |
| 9,932,074 B2* | 4/2018 | Sarhadiangardabad | ..................... | |
| | | | | B62D 35/02 |
| 9,969,367 B2* | 5/2018 | Schmidt | ................ | F16D 65/847 |
| 10,065,686 B2* | 9/2018 | Kishima | ................ | B62D 25/18 |
| 10,086,885 B2* | 10/2018 | Zuhlsdorf | .............. | B62D 35/02 |
| 2003/0173798 A1* | 9/2003 | Steinicke | .............. | B62D 35/00 |
| | | | | 296/180.1 |
| 2006/0237991 A1* | 10/2006 | Savo | .................... | B62D 35/005 |
| | | | | 296/180.5 |
| 2011/0095562 A1* | 4/2011 | Yamagishi | ............. | B62D 35/02 |
| | | | | 296/180.1 |
| 2013/0026790 A1* | 1/2013 | Kakiuchi | ............... | B62D 35/02 |
| | | | | 296/193.07 |
| 2015/0307137 A1 | 10/2015 | Kishima | | |
| 2016/0039479 A1* | 2/2016 | Kishima | ................ | B62D 25/08 |
| | | | | 296/181.5 |
| 2017/0057565 A1* | 3/2017 | Sarhadiangardabad | ..................... | |
| | | | | B62D 35/02 |
| 2017/0129552 A1* | 5/2017 | Han | ....................... | B62D 35/02 |
| 2017/0299006 A1* | 10/2017 | Shi | ......................... | B62D 35/02 |

FOREIGN PATENT DOCUMENTS

| | | |
|---|---|---|
| JP | 5943093 B2 | 6/2016 |
| JP | 2016-124452 A | 7/2016 |
| WO | 2014/087769 A1 | 6/2014 |

* cited by examiner

VEHICLE UNDERSTRUCTURE

INCORPORATION BY REFERENCE

The disclosure of Japanese Patent Application No. 2017-119801 filed on Jun. 19, 2017 including the specification, drawings and abstract is incorporated herein by reference in its entirety.

BACKGROUND

1. Technical Field

The present disclosure relates to a vehicle understructure.

2. Description of Related Art

A mud-guard structure for a vehicle having a flow adjusting part extending toward a vehicle lower side and a vehicle rear side at a mud-guard part provided at a rear end part of a wheel housing in which a wheel is disposed is suggested (for example, refer to Japanese Patent No. 5943093 (JP 5943093 B)). A muffler and a fuel tank are disposed at a lower part of a vehicle (for example, refer to Japanese Unexamined Patent Application Publication No. 2003-3838 (JP 2003-3838 A)).

SUMMARY

However, in the flow adjusting part extending toward the vehicle lower side and the vehicle rear side, there is a possibility that an air flow that has been guided by the flow adjusting part and has flowed toward the vehicle rear side during the traveling of a vehicle may be diffused and flow outward in the vehicle width direction, and there is a possibility that stabilization of the air flow that flows toward the vehicle rear side may become difficult.

In a case where a portion of the muffler or the fuel tank protrudes further toward a vehicle lower side than the rocker panel, the portion of the protruding muffler or fuel tank becomes an obstacle during the traveling of the vehicle. As a result, there is a possibility that a portion of the air flow flowing on a lower surface side of the vehicle may be diffused and flow to the vehicle rear side, such as being moved toward the rear surface side of the obstacle, or there is a possibility that stabilization of the air flow that flows toward the vehicle rear side may become difficult.

The disclosure obtains a vehicle understructure that can suppress diffusion of an air flow that flows toward a vehicle rear side during the traveling of a vehicle.

A first aspect relates to a vehicle understructure including a flow adjusting member provided rearward of a protruding member protruding further toward a vehicle lower side than a lower surface of a rocker panel, a front bumper, or a rear bumper as viewed from a vehicle width direction. The flow adjusting member is configured to adjust an air flow that flows from a vehicle front side toward a vehicle rear side along the protruding member during traveling of a vehicle. The flow adjusting member has a main part and a guide part provided at a lower part of an end part of the flow adjusting member, the guide part being inclined with respect to the main part toward the vehicle rear side such that a distance between the guide part and a rear end of the vehicle reduces toward an end part of the guide part in the vehicle width direction.

According to the first aspect, the flow adjusting member is provided rearward of the protruding member protruding further toward the vehicle lower side than the lower surface of the rocker panel, the front bumper, or the rear bumper as viewed from the vehicle width direction. The guide part is provided at the lower part of an end part of the flow adjusting member in a vehicle-width direction so as to inclined with respect to the main part toward a vehicle rear side such that a distance between the guide part and a rear end of the vehicle reduces toward an end part of the guide part in a vehicle width direction. Hence, the air that has flowed from the vehicle front side toward the vehicle rear side along the protruding member during the traveling of the vehicle flows toward the vehicle rear side on the end part of the flow adjusting member along the guide part of the flow adjusting member. Therefore, the diffusion of the air flow that flows toward the vehicle rear side is suppressed.

In the vehicle understructure according to the first aspect, the guide part may include an inclined surface of which an angle with respect to a vertical direction increases toward the end part of the guide part, as viewed from the vehicle width direction.

According to the first aspect, the guide part of the flow adjusting member includes the inclined surface of which the angle with respect to the vertical direction increases toward the end part of the guide part, as viewed from the vehicle width direction. Hence, the air that flows from the vehicle front side toward the vehicle rear side along the protruding member during the traveling of the vehicle effectively flows toward the vehicle rear side on the end part of the flow adjusting member along the inclined surface of the guide part of the flow adjusting member.

In the vehicle understructure according to the first aspect, the inclined surface may be provided such that a height of the inclined surface in the vertical direction increases toward the end part of the guide part, as viewed from a vehicle front-rear direction.

According to the first aspect, the inclined surface of the guide part is provided such that the height of the inclined surface in the vertical direction increases toward the end part of the guide part, as viewed from the vehicle front-rear direction. Hence, the air that flows from the vehicle front side toward the vehicle rear side along the protruding member during the traveling of the vehicle more effectively flows toward the vehicle rear side on the end part of the flow adjusting member along the inclined surface of the guide part of the flow adjusting member.

In the vehicle understructure according to the first aspect, the guide part may include a curved surface of which a curvature increases toward the end part of the guide part, as viewed from the vehicle width direction.

According to the first aspect, the guide part of the flow adjusting member includes the curved surface of which the curvature a curvature increases toward the end part of the guide part, as viewed from the vehicle width direction. Hence, the air that flows from the vehicle front side toward the vehicle rear side along the protruding member during the traveling of the vehicle effectively flows toward the vehicle rear side on the end part of the flow adjusting member along the curved surface of the guide part of the flow adjusting member.

In the vehicle understructure according to the first aspect, the curved surface may be provided such that a height of the curved surface in a vertical direction increases toward the end part of the guide part, as viewed from a vehicle front-rear direction.

According to the first aspect, the curved surface of the guide part is provided such that the height of the curved surface in the vertical direction increases toward the end part of the guide part, as viewed from the vehicle front-rear direction. Hence, the air that flows from the vehicle front side toward the vehicle rear side along the protruding member during the traveling of the vehicle more effectively flows toward the vehicle rear side on the end part of the flow adjusting member along the curved surface of the guide part of the flow adjusting member.

In the vehicle understructure according to the first aspect, the guide part may have an overhanging part that further extends along the vehicle width direction from the end part of the flow adjusting member and extends toward the vehicle rear side from the end part of the flow adjusting member.

According to the first aspect, the guide part has the overhanging part that further extends along the vehicle width direction from the end part of the flow adjusting member and extends toward the vehicle rear side from the end part of the flow adjusting member. Hence, the air that flows from the vehicle front side toward the vehicle rear side along the protruding member during the traveling of the vehicle more effectively flows toward the vehicle rear side on the end part of the flow adjusting member along the overhanging part of the guide part of the flow adjusting member.

In the vehicle understructure according to the first aspect, the flow adjusting member may have a cutout part at an upper part of the end part of the flow adjusting member, and the guide part has an overhanging part that overhangs further toward the end part of the flow adjusting member than the cutout part and extends toward the vehicle rear side from the end part of the flow adjusting member.

According to the first aspect, the flow adjusting member has the cutout part at the upper part of the end part of the flow adjusting member, and the guide part has the overhanging part that overhangs further toward the end part of the flow adjusting member than the cutout part and extends toward the vehicle rear side from the end part of the flow adjusting member. Hence, the air that flows from the vehicle front side toward the vehicle rear side along the protruding member during the traveling of the vehicle more effectively flows toward the vehicle rear side on the end part of the flow adjusting member along the overhanging part of the guide part of the flow adjusting member, and the air that flows through the cutout part is effectively joined to the air that flows toward the vehicle rear side from the end part of the flow adjusting member.

In the vehicle understructure according to the first aspect, the flow adjusting member may have a sub-guide part that is provided above the guide part such that the sub-guide part is inclined with respect to the guide part toward the vehicle rear side such that a distance between the sub-guide part and the rear end of the vehicle reduces toward an end part of the sub-guide part in the vehicle width direction.

According to the first aspect, the flow adjusting member has the sub-guide part that is provided above the guide part such that the sub-guide part is inclined with respect to the guide part toward the vehicle rear side such that a distance between the sub-guide part and the rear end of the vehicle reduces toward an end part of the sub-guide part in the vehicle width direction. Hence, the air that flows from the vehicle front side toward the vehicle rear side along the protruding member during the traveling of the vehicle more effectively flows toward the vehicle rear side on the end part of the flow adjusting member along the guide part and the sub-guide part of the flow adjusting member.

In the vehicle understructure according to the first aspect, a maximum height of the inclined surface may be equal to a height of the vehicle-width-direction end part of the flow adjusting member.

According to the first aspect, the maximum height of the inclined surface of the guide part is equal to the height of the end part of the flow adjusting member. Hence, the air that flows from the vehicle front side toward the vehicle rear side along the protruding member during the traveling of the vehicle more effectively flows toward the vehicle rear side on the end part of the flow adjusting member along the inclined surface of the guide part of the flow adjusting member.

In the vehicle understructure according to the first aspect, a maximum height of the curved surface may be equal to a height of the end part of the flow adjusting member.

According to the first aspect, the maximum height of the curved surface of the guide part is equal to the height of the end part of the flow adjusting member. Hence, the air that flows from the vehicle front side toward the vehicle rear side along the protruding member during the traveling of the vehicle more effectively flows toward the vehicle rear side on the end part of the flow adjusting member along the curved surface of the guide part of the flow adjusting member.

In the vehicle understructure according to the first aspect, the protruding member may be at least one of a front wheel and a rear wheel, the flow adjusting member may be provided at a rear lower part of a wheel housing, and the guide part may be provided on an inner side of the flow adjusting member in the vehicle width direction.

According to the first aspect, the protruding member is at least one of the front wheel and the rear wheel, the flow adjusting member is provided at the rear lower part of the wheel housing, and the guide part is provided on an inner side of the flow adjusting member in the vehicle width direction. Hence, the air that flows toward the vehicle rear side along the surface inner of the front wheel or the rear wheel in the vehicle width direction during the traveling of the vehicle effectively flows toward the vehicle rear side on the inner side of the flow adjusting member in the vehicle width direction along the guide part of the flow adjusting member.

In the vehicle understructure according to the first aspect, the protruding member may be a spare tire, and the flow adjusting member may be provided on a lower surface of the rear bumper.

According to the first aspect, the protruding member is the spare tire, and the flow adjusting member is provided on the lower surface of the rear bumper. Hence, the air that flows toward the vehicle rear side along the surface of the spare tire facing the vehicle width direction during the traveling of the vehicle effectively flows toward the vehicle rear side on the end part of the flow adjusting member along the guide part of the flow adjusting member.

In the vehicle understructure according to the first aspect, the protruding member may be a muffler, and the flow adjusting member may be provided rearward of the muffler.

According to the first aspect, the protruding member is the muffler, and the flow adjusting member is provided rearward of the muffler. Hence, the air that flows toward the vehicle rear side along the surface of the muffler facing the vehicle width direction during the traveling of the vehicle effectively flows toward the vehicle rear side on the end part of the flow adjusting member along the guide part of the flow adjusting member.

In the vehicle understructure according to the first aspect, the protruding member may be a fuel tank, and the flow adjusting member may be provided rearward of the fuel tank.

According to the first aspect, the protruding member is the fuel tank, and the flow adjusting member is provided rearward of the fuel tank. Hence, the air that flows toward the vehicle rear side along the surface of the fuel tank facing the vehicle width direction during the traveling of the vehicle effectively flows toward the vehicle rear side on the end part of the flow adjusting member along the guide part of the flow adjusting member.

In the vehicle understructure according to the first aspect, the guide part may be provided on an inner side of the flow adjusting member in the vehicle width direction.

According to the first aspect, the guide part is provided on the inner side of the flow adjusting member in the vehicle width direction. Hence, the air that flows toward the vehicle rear side during the traveling of the vehicle effectively flows toward the vehicle rear side on the inner side of the flow adjusting member in the vehicle width direction along the guide part of the flow adjusting member.

A second aspect relates to a vehicle understructure including a flow adjusting member provided rearward of a protruding member protruding further toward a vehicle lower side than a lower surface of a rocker panel, a front bumper, or a rear bumper as viewed from a vehicle width direction. The flow adjusting member is configured to adjust an air flow that flows from a vehicle front side toward a vehicle rear side along the protruding member during traveling of a vehicle. A lower part of an end part of the flow adjusting member in the vehicle width direction has a shape for guiding the air flow toward the end part of the flow adjusting member.

According to the second aspect, the air that flows from the vehicle front side toward the vehicle rear side along the protruding member during the traveling of the vehicle is guided toward the end part of the flow adjusting member by the flow adjusting member. Hence, the diffusion of the air flow that flows toward the vehicle rear side is suppressed.

A third aspect relates to a vehicle understructure including a flow adjusting member provided at a rear lower part of a wheel housing in at least one of a front wheel and a rear wheel. The flow adjusting member is configured to adjust an air flow that flows toward a vehicle rear side along the front wheel or the rear wheel from a vehicle front side during traveling of a vehicle. An inner lower part of the flow adjusting member in a vehicle width direction has a shape for guiding the air flow inward in the vehicle width direction.

According to the third aspect, the air flow that has flowed from the vehicle front side toward the vehicle rear side along the protruding member during the traveling of the vehicle flows toward the vehicle rear side on the end part of the flow adjusting member along the guide part of the flow adjusting member. Therefore, the diffusion of the air flow that flows toward the vehicle rear side is suppressed.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, embodiments will be described in detail with reference to the drawings. For the convenience of description, as appropriately illustrated in the respective drawings, arrow UP indicates a vehicle upward direction, arrow FR indicates a vehicle forward direction, and arrow RH indicates a vehicle rightward direction. Hence, in the following description, in a case where a front-rear direction, an upward-downward direction, and a rightward-leftward direction are described unless otherwise noted, these directions respectively indicate up and down in a vehicle upward-downward direction, front and rear in a vehicle front-rear direction, and right and left in a vehicle rightward-leftward direction (vehicle width direction).

First Embodiment

Figure 1:
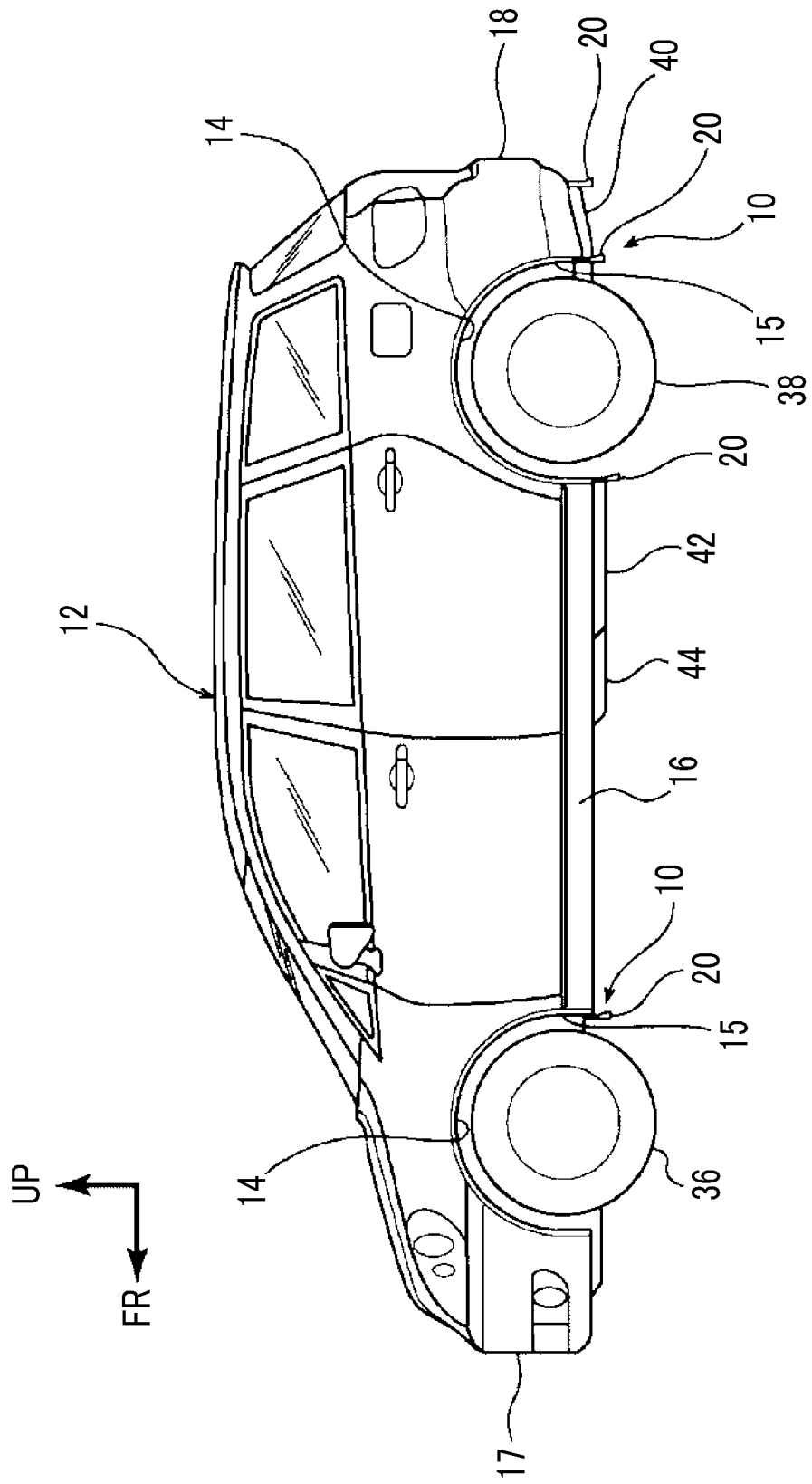
FIG. 1 is a side view illustrating a vehicle including a vehicle understructure related to an embodiment.
Figure 2:
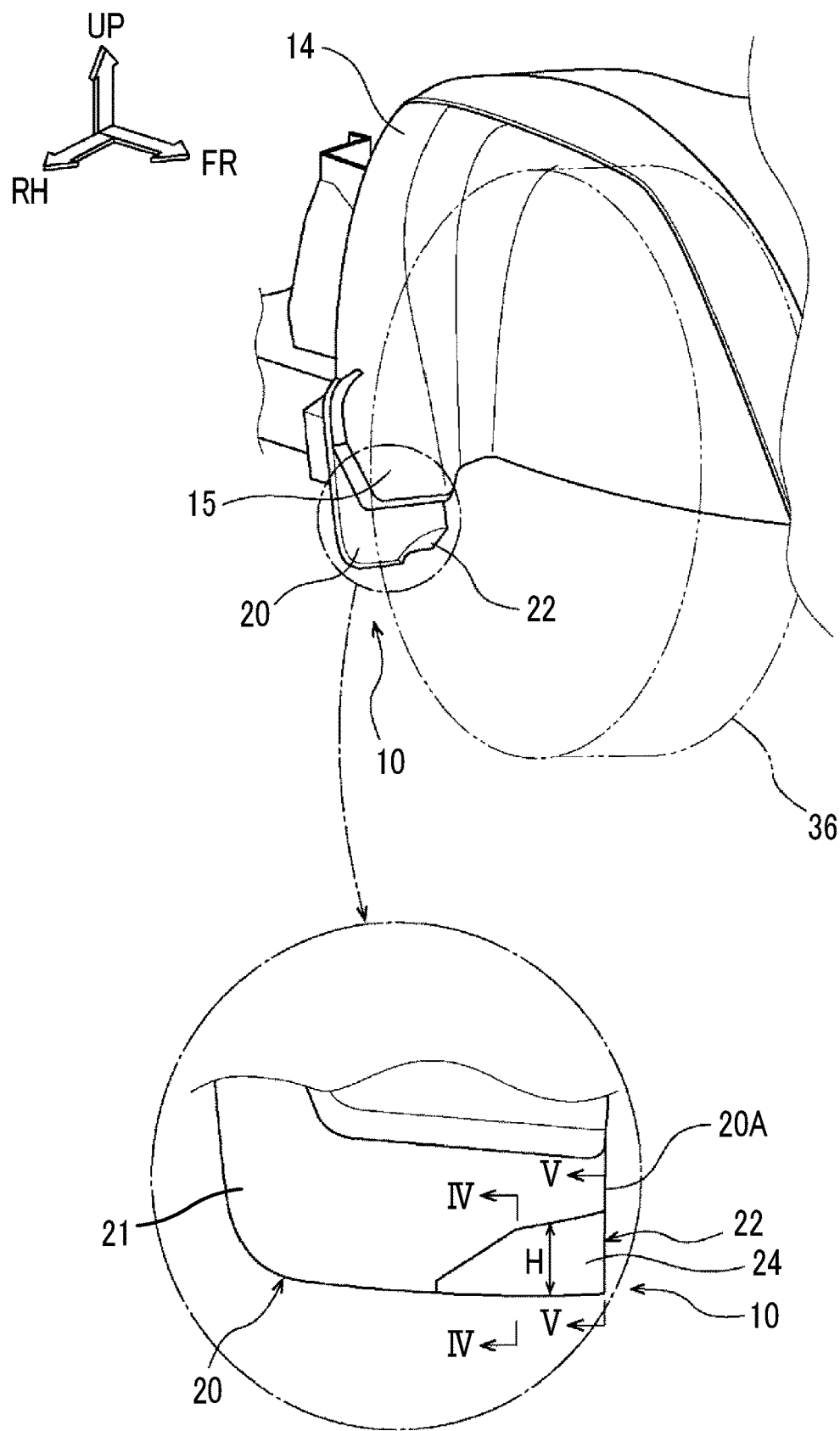
FIG. 2 is a perspective view and an enlarged front view illustrating a flow adjusting member related to a first embodiment.

A vehicle understructure 10 related to a first embodiment will be described. As illustrated in FIG. 1 and FIG. 2, mud-guard parts 15 are respectively provided on rear lower parts of wheel housings 14 in which a front wheel 36 and a rear wheel 38 of a vehicle 12 are disposed. A flow adjusting member 20 made of resin that constitutes the vehicle understructure 10 is integrally attached to a lower end part of the mud-guard part 15 provided at each wheel housing 14.

The flow adjusting member 20 may be provided solely at the mud-guard part 15 of the front wheel 36 or solely at the mud-guard part 15 of the rear wheel 38. Hence, the flow adjusting member 20 provided on the front wheel 36 side will be described below. The front wheel 36 and the rear wheel 38 are examples of protruding members that protrude further toward a vehicle lower side than a lower surface of a rocker panel 16, a front bumper 17, or a rear bumper 18 in a side view as viewed from the vehicle width direction.

Figure 6:
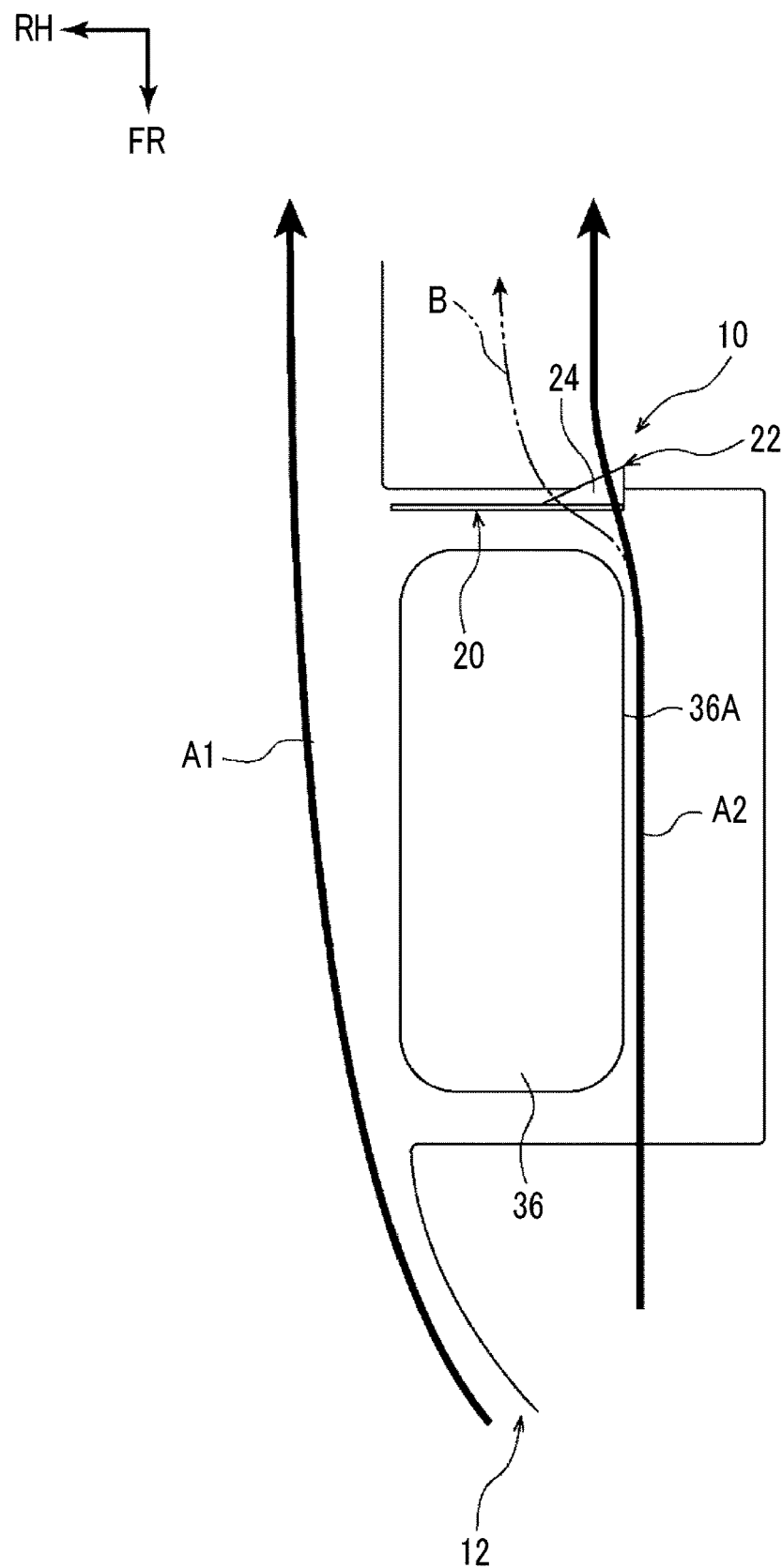
FIG. 6 is a schematic view illustrating an air flow formed by the flow adjusting member related to the first embodiment.

As illustrated in FIG. 6, the flow adjusting member 20 adjusts an air flow A2 that has flowed toward the vehicle rear side along a surface (hereinafter referred to as a "vehicle-width-direction inner end surface 36A") of the front wheel 36 (including a tire and a wheel) facing inward in the vehicle width direction from a vehicle front side during the traveling of the vehicle 12, and is formed in a substantially oblong shape having the vehicle width direction as a longitudinal direction in a front view as viewed from the vehicle front-rear direction.

Figure 3:
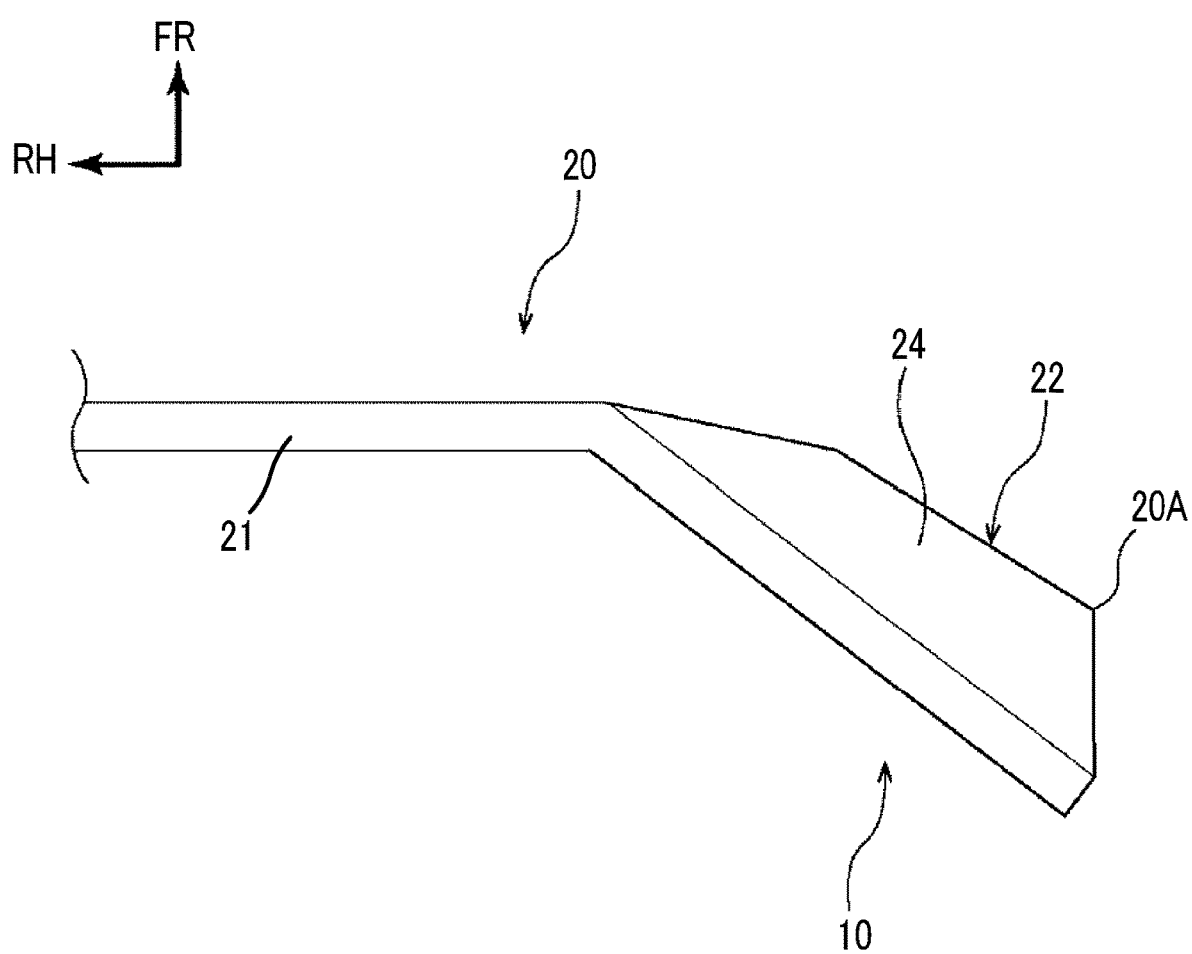
FIG. 3 is a bottom view illustrating a guide part of the flow adjusting member related to the first embodiment.

As illustrated in FIG. 2, the flow adjusting member 20 has a main part 21 and a guide part 22. The guide part 22 is formed in a shape for guiding the air flow A2 inward in the vehicle width direction at a lower part at a vehicle-width-direction inner end part (vehicle-width-direction end part) 20A of the flow adjusting member 20. That is, as illustrated in FIG. 3, the guide part 22 is formed so as to be inclined with respect to the main part toward a vehicle rear side such that a distance between the guide part and a rear end of the vehicle reduces toward an end part of the guide part in a vehicle width direction.

Figure 4:
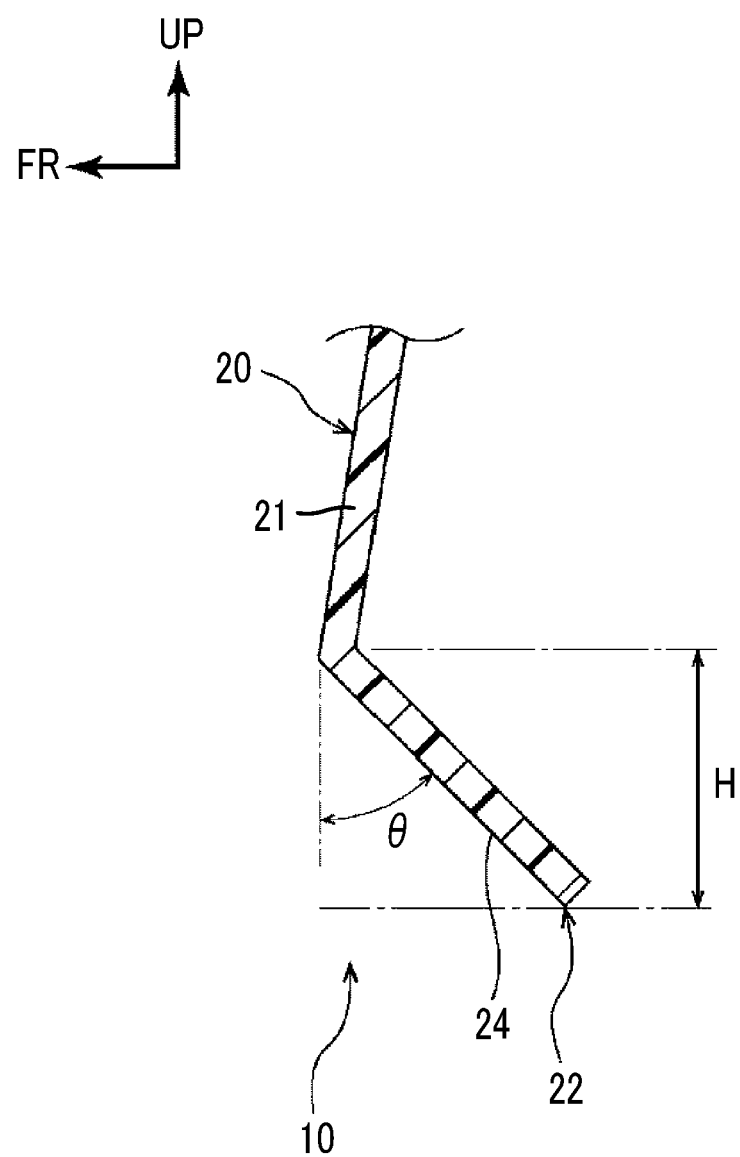
FIG. 4 is a sectional view as seen in an arrow direction along line IV-IV in FIG. 2.
Figure 5:
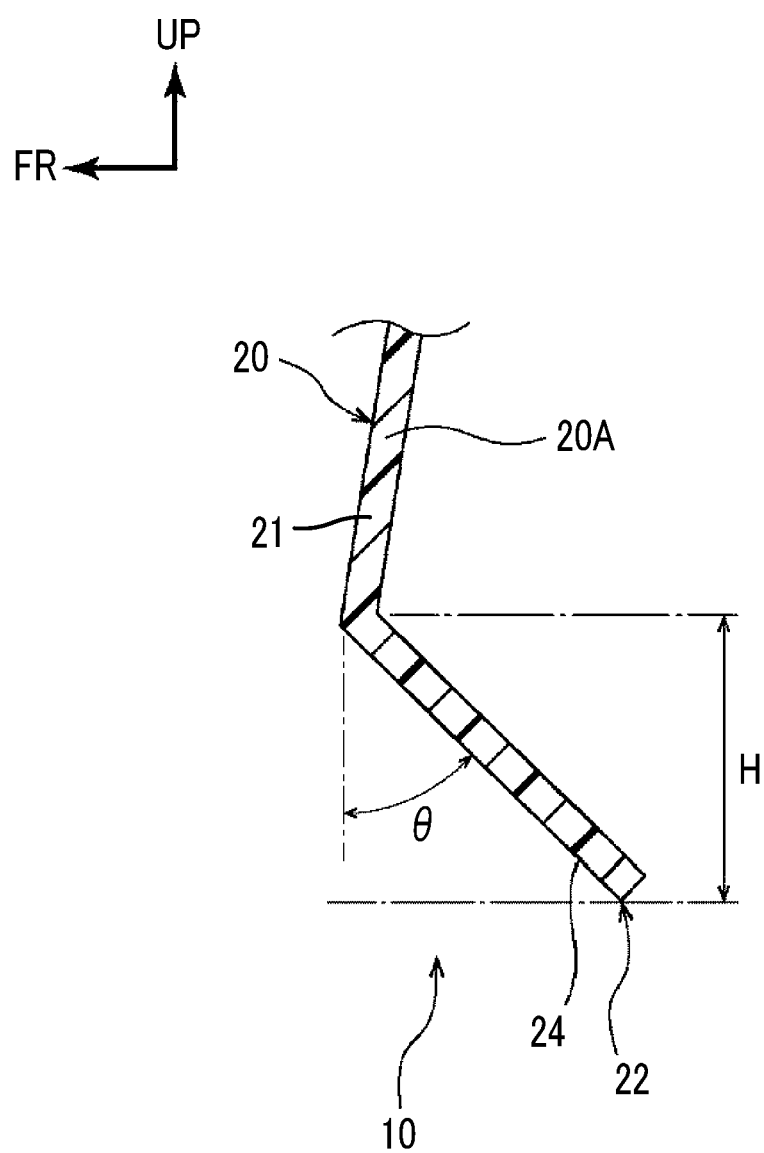
FIG. 5 is a sectional view as seen in an arrow direction along line V-V in FIG. 2.

In more detail, as illustrated in FIG. 4 and FIG. 5, the guide part 22 is constituted of an inclined surface 24 of which an angle θ with respect to the vertical direction becomes gradually greater inward in the vehicle width direction from the outer side in the vehicle width direction in a side view as viewed from the vehicle width direction. As illustrated in FIG. 2, the inclined surface 24 is provided such that a height H (also refer to FIG. 4 and FIG. 5) thereof in the vertical direction becomes gradually higher inward in the vehicle width direction from the outer side in the vehicle width direction in a front view viewed from the vehicle front-rear direction.

Figure 7:
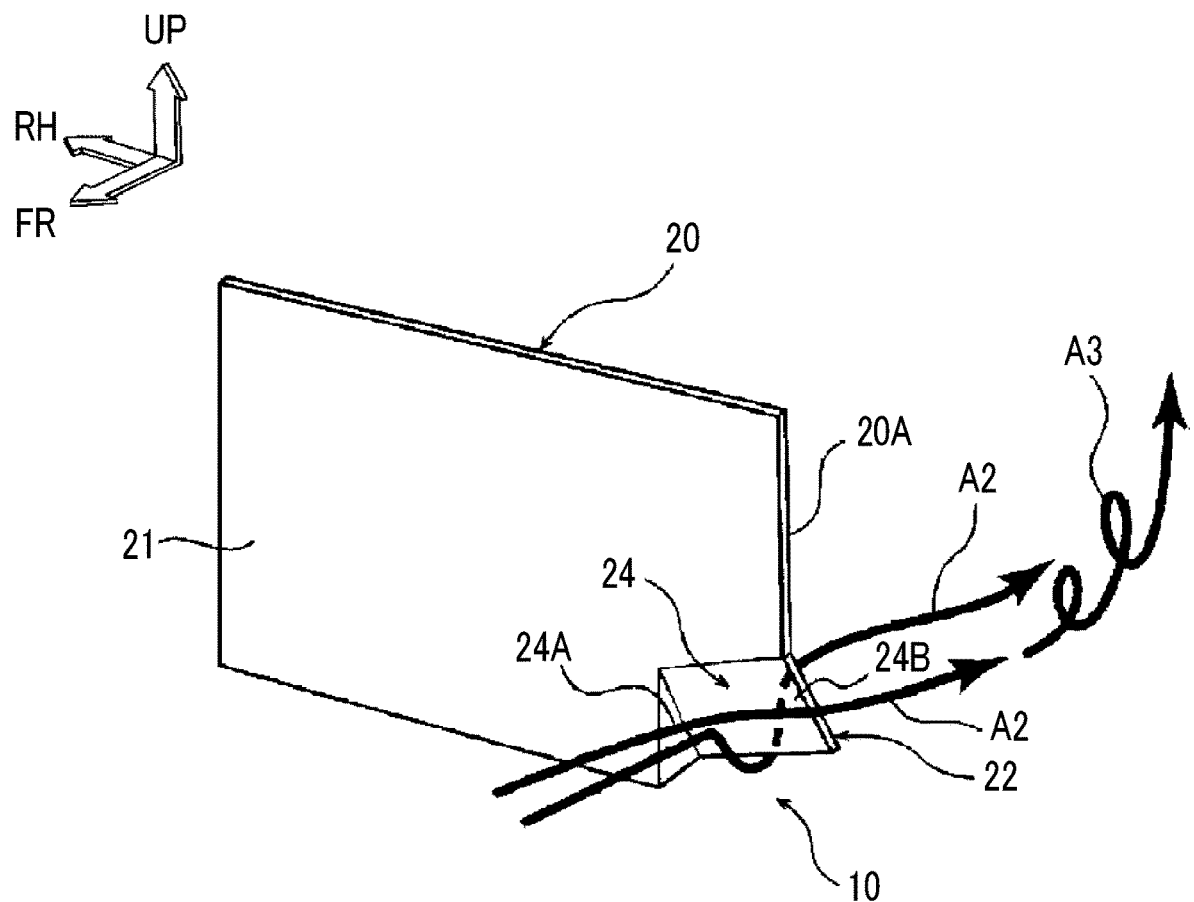
FIG. 7 is an enlarged schematic view illustrating the air flow formed by the flow adjusting member related to the first embodiment.

In other words, as illustrated in FIG. 7, the inclined surface 24 of the guide part 22 is constituted of a first flat surface 24A that is seen in a substantially triangular shape in a side view as viewed from the vehicle width direction, and a second flat surface 24B that is continuous with the first flat surface 24A in the vehicle width direction and is seen in a substantially trapezoidal shape in a front view as viewed from the vehicle front-rear direction. The area of the second flat surface 24B is formed to be greater than the area of the first flat surface 24A.

In the vehicle understructure 10 including the flow adjusting member 20 related to the first embodiment having the configuration as described above, the operation thereof will be described.

As illustrated in FIG. 6, during the traveling of the vehicle 12, in a plan view, at least an air flow A1 that flows toward the vehicle rear side along a surface of the vehicle 12 facing outward in the vehicle width direction, and an air flow A2 that flows toward the vehicle rear side along the vehicle-width-direction inner end surface 36A of the front wheel 36 are formed.

Figure 22:
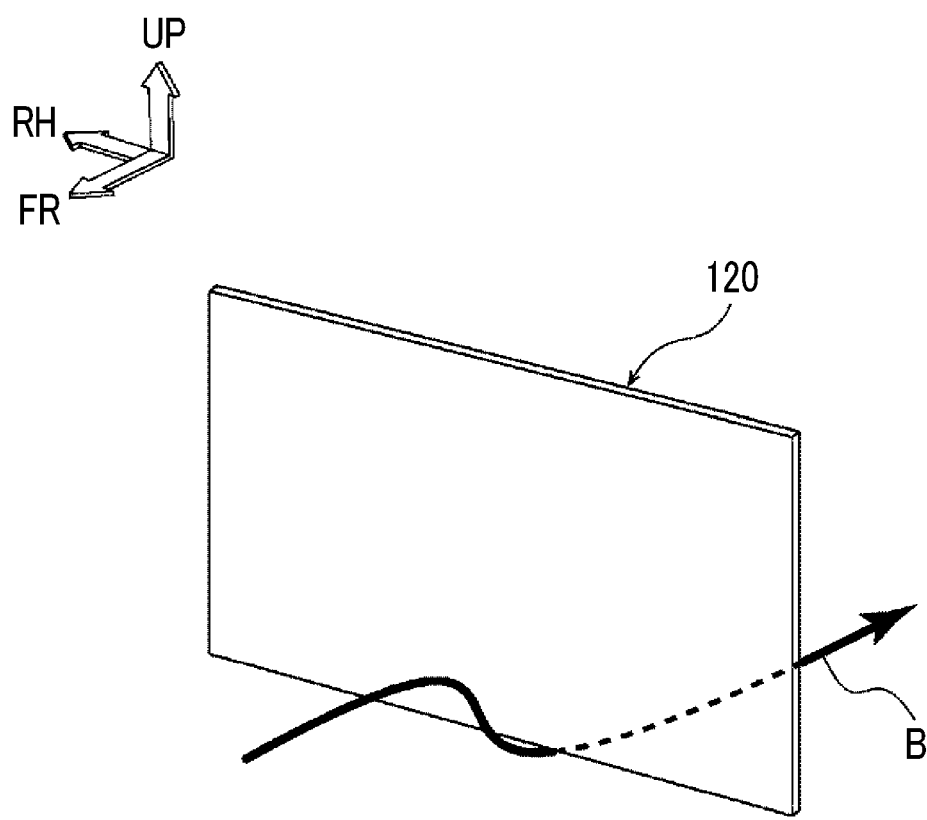
FIG. 22 is an enlarged schematic view illustrating an air flow formed by a flow adjusting member related to a comparative example.

Here, as illustrated in FIG. 22, in the case of a vehicle including a flow adjusting member 120 related to a comparative example having no guide part 22, as indicated by an arrow of a two-dot chain line in FIG. 6, at least a portion of the air flow A2 that flows toward the vehicle rear side along the vehicle-width-direction inner end surface 36A of the front wheel 36 becomes an air flow B that flows toward the vehicle rear side through a lower end part of the flow adjusting member 120 while flowing outward in the vehicle width direction from a gap between a rear part of the front wheel 36 and a rear part of the wheel housing 14 (while being moved rearward of the front wheel 36).

Hence, there is a possibility that the air flow B guided by the flow adjusting member 120 is diffused and flows outward in the vehicle width direction from the rear side of the flow adjusting member 120. That is, in the flow adjusting member 120 having no guide part 22, it is difficult to collect (guide) the air flow A2, which flows toward the vehicle rear side along the vehicle-width-direction inner end surface 36A of the front wheel 36, inward in the vehicle width direction. As a result, there is a possibility that it is difficult to stabilize the air flow A2.

In contrast to the above, in the case of the vehicle 12 including the flow adjusting member 20 related to the first embodiment having the guide part 22 (inclined surface 24), as indicated by arrows of solid lines in FIG. 6 and illustrated in FIG. 7, the air flow A2 that flows toward the vehicle rear side along the vehicle-width-direction inner end surface 36A of the front wheel 36 can be effectively made to flow toward the vehicle rear side on the inner side of the flow adjusting member in the vehicle width direction along the inclined surface 24 in the guide part 22 of the flow adjusting member 20 (can be collected inward in the vehicle width direction and be made to flow toward the vehicle rear side).

Therefore, the air flow A2 guided by the guide part 22 of the flow adjusting member 20 becomes an air flow A3 of a vertical vortex, and the air flow A3 that becomes the vertical vortex is reinforced by the air flow A2 that further flows around from a lower end part of the guide part 22 toward a rear surface of the guide part 22. In other words, the flow speed of the air flow A2 that flows toward the vehicle rear side along the vehicle-width-direction inner end surface 36A of the front wheel 36 is sped up by the air flow A3, and the inertia force of the air flow A2 that flows rearward of the front wheel 36 is increased.

Hence, the loss of an air flow resulting from shortage of an inertia force (the air flow B moved rearward of the front wheel 36 or an air flow sucked out outward in the vehicle width direction) is further reduced, and the diffusion of the air flow A2 outward in the vehicle width direction is suppressed. That is, the air flow A2 that flows toward the vehicle rear side along the vehicle-width-direction inner end surface 36A of the front wheel 36 can be stabilized, and the behavior of the front wheel 36 can be stabilized. Therefore, the steering stabilization performance of the vehicle 12 can be improved, and the air resistance of the vehicle 12 can also be further reduced.

The flow adjusting member 20 that constitutes the vehicle understructure 10 related to the first embodiment adjusts the air flow A2 (traveling wind) that flows toward the vehicle rear side along the vehicle-width-direction inner end surface 36A of the front wheel 36. Hence, the flow adjusting member 20 has a different purpose from that of a flow adjusting member (not illustrated) that is disposed forward of the front wheel 36 in order not to apply a traveling wind to a front part of the front wheel 36.

Second Embodiment

A vehicle understructure 10 related to a second embodiment will be described. Parts equivalent to those of the first embodiment will be designated by the same reference signs and the detailed description (including also common operation) thereof will be omitted.

Figure 8:
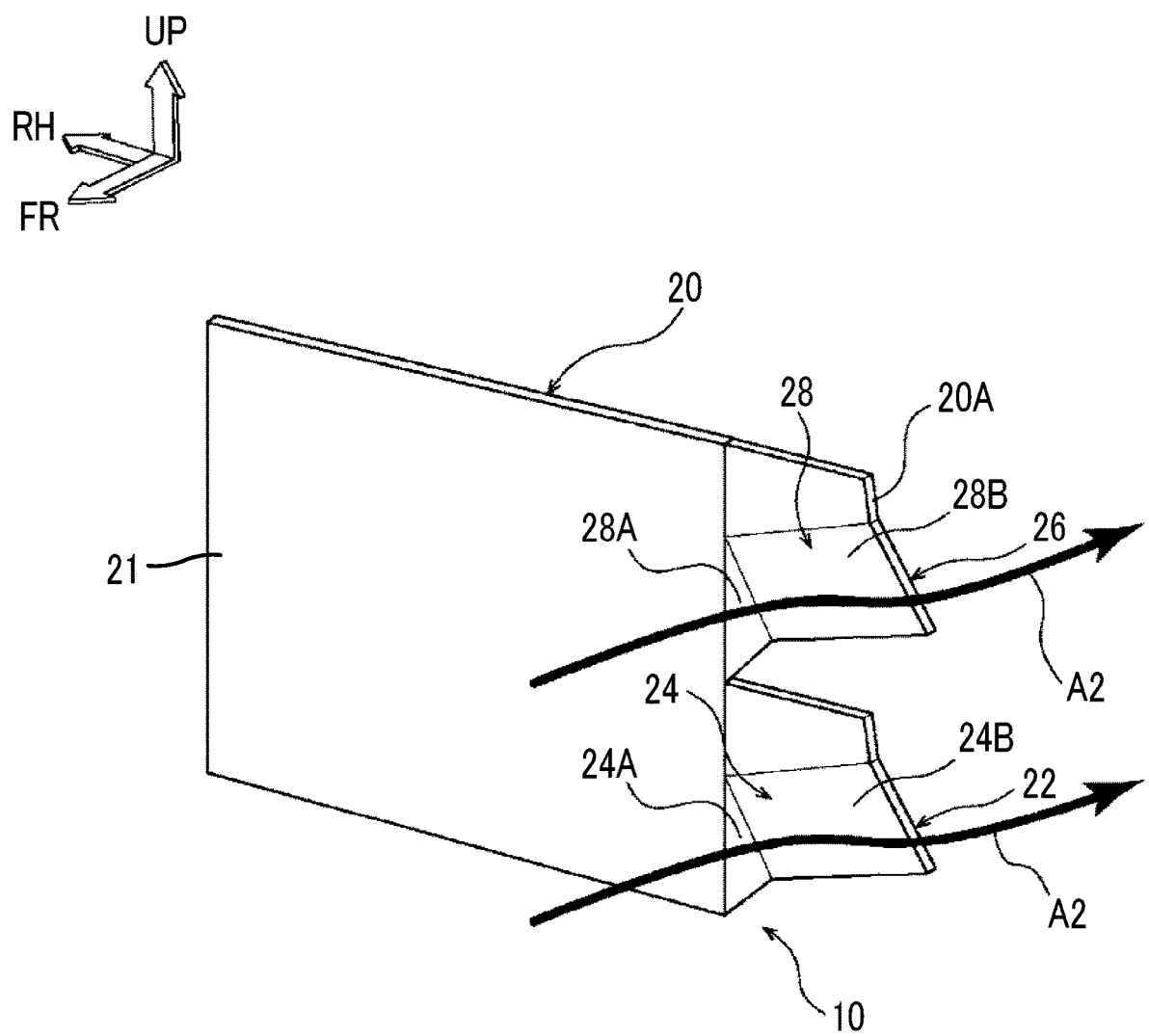
FIG. 8 is a schematic view illustrating a flow adjusting member related to a second embodiment.

As illustrated in FIG. 8, a sub-guide part 26 equivalent to the guide part 22 is formed at an upper part in the vehicle-width-direction inner end part 20A of the flow adjusting member 20 related to the second embodiment. In other words, the sub-guide part 26 having an inclined surface 28 directed toward the vehicle rear side on the inner side of the flow adjusting member in the vehicle width direction toward the inner side of the flow adjusting member in the vehicle width direction is formed at the vehicle-width-direction inner end part 20A of the flow adjusting member 20 above the guide part 22.

That is, the inclined surface 28 of the sub-guide part 26 is also constituted of a first flat surface 28A that is seen in a substantially triangular shape in a side view as viewed from the vehicle width direction, and a second flat surface 28B that is continuous with the first flat surface 28A in the vehicle width direction and is seen in a substantially trapezoidal shape in a front view as viewed from the vehicle front-rear direction. The area of the second flat surface 28B is formed to be greater than the area of the first flat surface 28A.

With the flow adjusting member 20 related to the second embodiment having the sub-guide part 26 as mentioned above, the air flow A2 that flows toward the vehicle rear side along the vehicle-width-direction inner end surface 36A of the front wheel 36 flows toward the vehicle rear side on the inner side of the flow adjusting member in the vehicle width direction and along the inclined surface 24 of the guide part 22 in the flow adjusting member 20, and flows toward the inner side of the flow adjusting member in the vehicle width direction and the vehicle rear side along the inclined surface 28 of the sub-guide part 26. Hence, the diffusion of the air flow A2 outward in the vehicle width direction that flows toward the vehicle rear side can be further suppressed.

More specifically, when the sub-guide part 26 is not formed above the guide part 22, there is a possibility that a portion of the air flow A2 that has flowed toward the vehicle-width-direction inner end part 20A of the flow adjusting member 20 above the guide part 22 may be moved rearward of the vehicle-width-direction inner end part 20A.

However, when the sub-guide part 26 is formed above the guide part 22, a situation in which a portion of the air flow A2 is moved rearward of the vehicle-width-direction inner end part 20A in the flow adjusting member 20 can be suppressed, and a portion of the air flow A2 can be stably made to flow toward the vehicle rear side on the inner side of the flow adjusting member in the vehicle width direction.

Third Embodiment

A vehicle understructure 10 related to a third embodiment will be described. Parts equivalent to those of the first and second embodiments will be designated by the same reference signs and the detailed description (including also common operation) thereof will be omitted.

Figure 9:
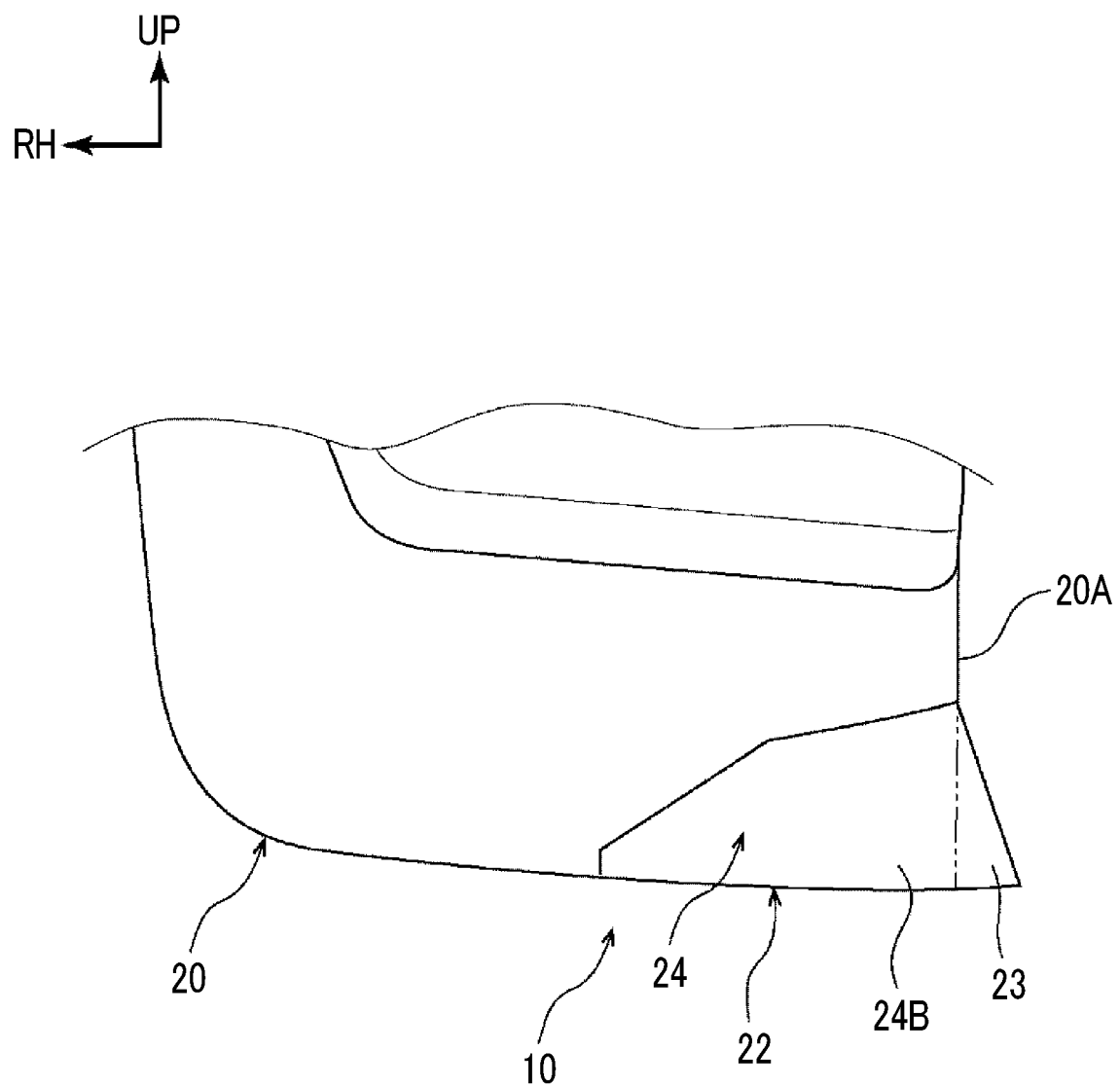
FIG. 9 is a front view illustrating a flow adjusting member related to a third embodiment.

As illustrated in FIG. 9, a portion of the guide part 22 of the flow adjusting member 20 related to this third embodiment overhangs further inward in the vehicle width direction than the vehicle-width-direction inner end part 20A of the flow adjusting member 20, in a front view as viewed from the vehicle front-rear direction. More specifically, the guide part 22 has an overhanging part 23 that overhangs substantially in the shape of a right-angled triangle toward the vehicle rear side on the inner side of the flow adjusting member in the vehicle width direction, and the area of the second flat surface 24B that constitutes the inclined surface 24 is made greater than that of the first embodiment.

With the flow adjusting member 20 related to the third embodiment having the overhanging part 23 as mentioned above, the air flow A2 that flows toward the vehicle rear side along the vehicle-width-direction inner end surface 36A of the front wheel 36 are further collected inward in the vehicle width direction by the inclined surface 24 of the guide part 22, and particularly, the second flat surface 24B having the overhanging part 23. Hence, the air flow A2 more effectively flows toward the vehicle rear side nearer to the inner side of the flow adjusting member in the vehicle width direction along the inclined surface 24. Therefore, the diffusion of the air flow A2 outward in the vehicle width direction that flows toward the vehicle rear side can be further suppressed.

Fourth Embodiment

A vehicle understructure 10 related to a fourth embodiment will be described. Parts equivalent to those of the first to third embodiments will be designated by the same reference signs and the detailed description (including also common operation) thereof will be omitted.

Figure 10:
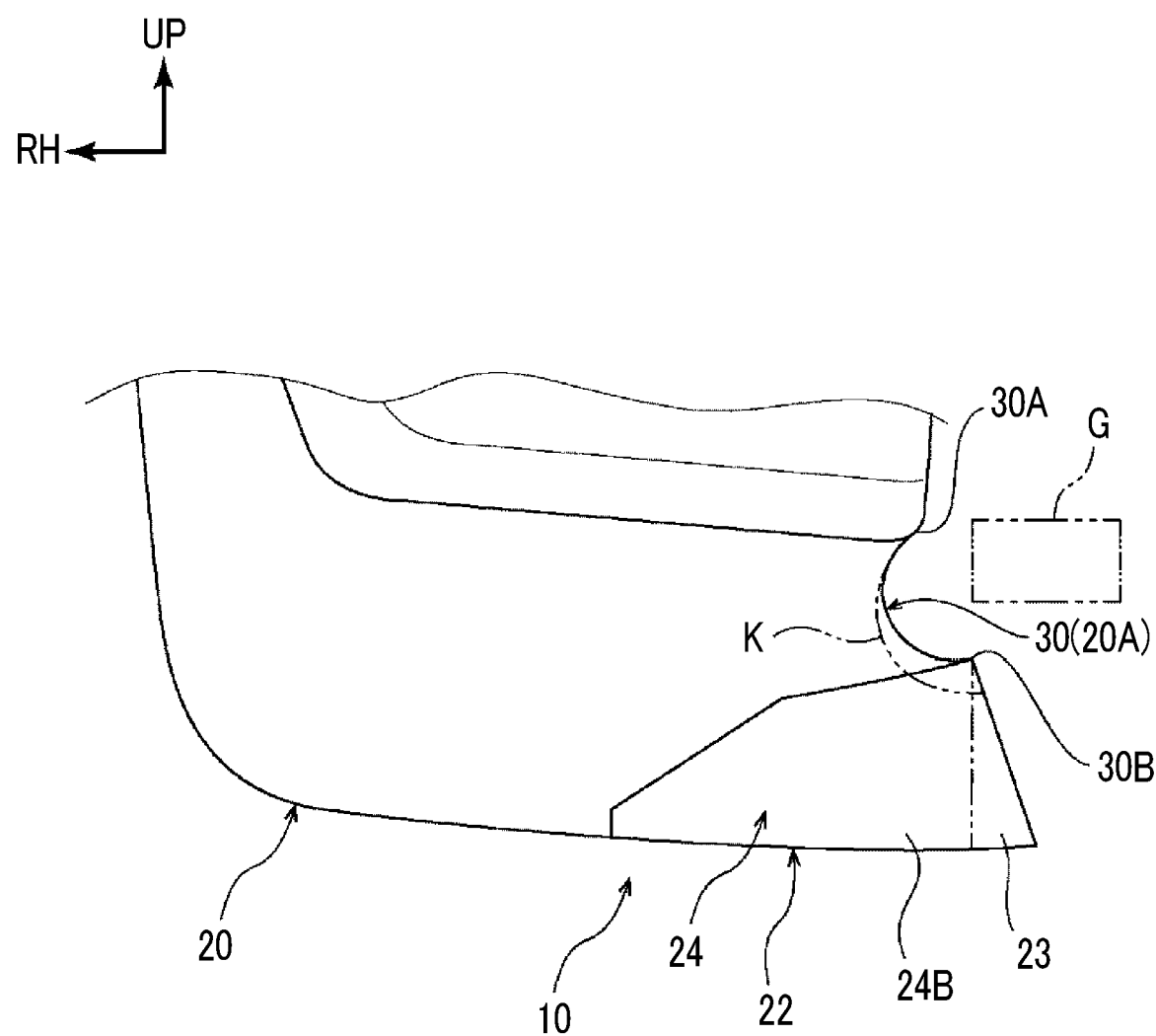
FIG. 10 is a front view illustrating a flow adjusting member related to a fourth embodiment.

As illustrated in FIG. 10, the flow adjusting member 20 related to the fourth embodiment has a cutout part 30 at an upper part of the vehicle-width-direction inner end part 20A. The guide part 22 of the flow adjusting member 20 also has the overhanging part 23 that overhangs substantially in the shape of a right-angled triangle toward the vehicle rear side on the inner side of the flow adjusting member in the vehicle width direction, similar to the third embodiment. More specifically, the guide part 22 has the overhanging part 23 that overhangs further inward in the vehicle width direction than a lower end part 30B as well as an upper end part 30A of the cutout part 30.

Although the illustrated cutout part 30 is formed in a substantially semicircular arc shape in a front view as viewed from the vehicle front-rear direction, the disclosure is not limited to this. For example, the cutout part 30 may be formed substantially in an "L" shape. The cutout part 30 may be formed including an upper end part of the second flat surface 24B. That is, as illustrated by a phantom line K, the upper end part of the second flat surface 24B including the overhanging part 23 may be cut out.

With the flow adjusting member 20 related to the fourth embodiment having the cutout part 30 and the overhanging part 23 as mentioned above, the air flow A2 that flows toward the vehicle rear side along the vehicle-width-direction inner end surface 36A of the front wheel 36 more effectively flows toward the vehicle rear side on the inner side of the flow adjusting member in the vehicle width direction along the inclined surface 24 of the guide part 22, and the air flow A2 (not illustrated) that has flowed through the cutout part 30 can be made to effectively join the air flow A3 that flows toward the vehicle rear side and becomes a vertical vortex (refer to FIG. 7).

Hence, the diffusion of the air flow A2 outward in the vehicle width direction that flows toward the vehicle rear side can be further suppressed. In addition, when the cutout part 30 as mentioned above is formed, for example even in a case where an obstacle G is nearer to the inner side of the flow adjusting member in the vehicle width direction than the vehicle-width-direction inner end part 20A of the flow adjusting member 20, there is also an advantage that the air flow A2 can be made to flow toward the vehicle rear side while avoiding the obstacle G (passing between the outside of the obstacle G in the vehicle width direction and the cutout part 30).

Fifth Embodiment

A vehicle understructure 10 related to a fifth embodiment will be described. Parts equivalent to those of the first to fourth embodiments will be designated by the same reference signs and the detailed description (including also common operation) thereof will be omitted.

Figure 11:
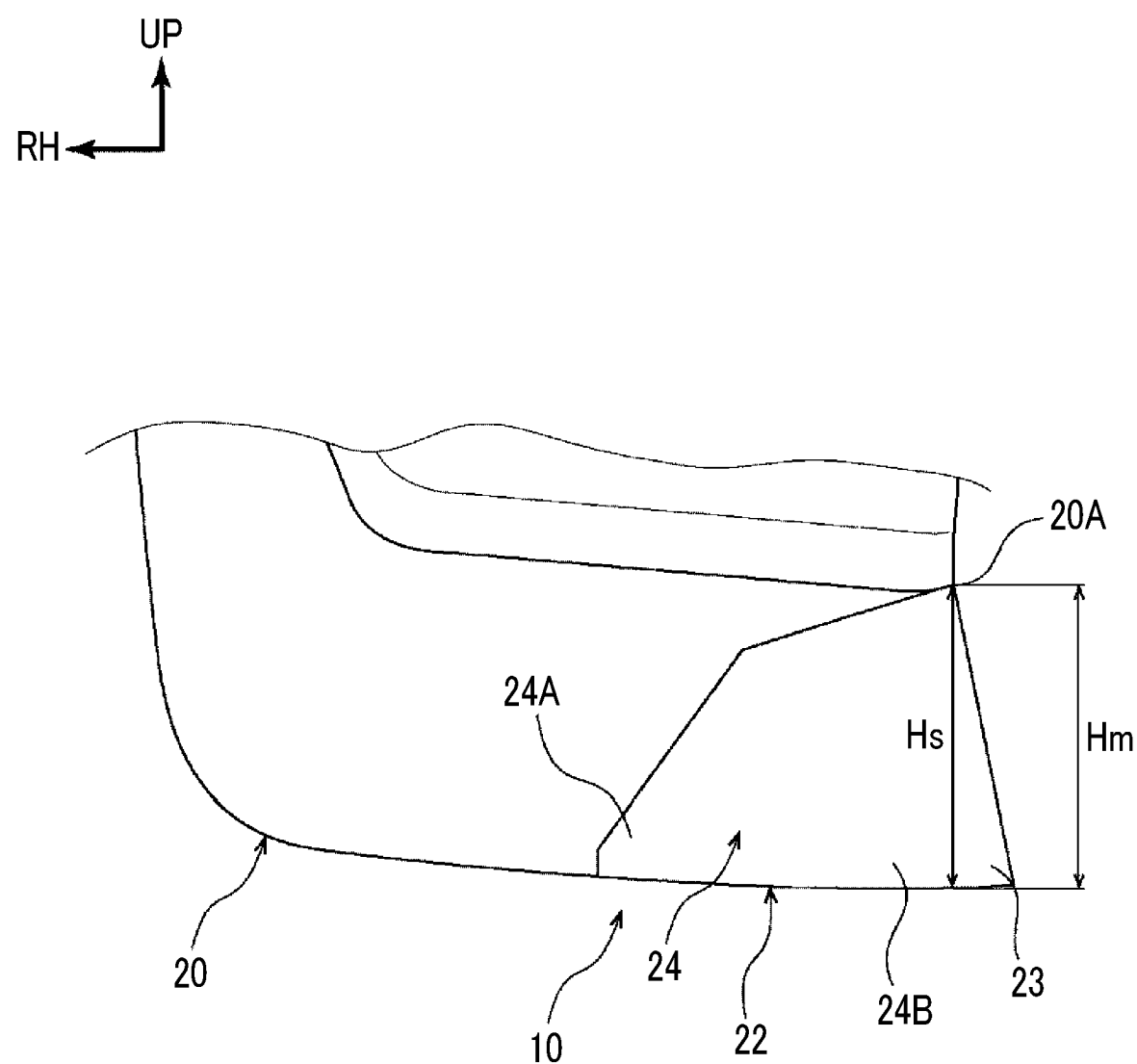
FIG. 11 is a front view illustrating a flow adjusting member related to a fifth embodiment.

As illustrated in FIG. 11, a maximum height Hm of the inclined surface 24 of the guide part 22 of the flow adjusting member 20 related to the fifth embodiment, is made equal to a height Hs of the vehicle-width-direction inner end part 20A of the flow adjusting member 20. That is, the first flat surface 24A and the second flat surface 24B that constitute the inclined surface 24 of the guide part 22 are formed so as to become larger than the maximum than the first flat surface 24A and the second flat surface 24B in the first to fourth embodiments.

With the flow adjusting member 20 related to the fifth embodiment having the inclined surface 24 as mentioned above, the air flow A2 that flows toward the vehicle rear side along the vehicle-width-direction inner end surface 36A of the front wheel 36 more effectively (a larger amount) flows toward the vehicle rear side on the inner side of the flow adjusting member in the vehicle width direction along the inclined surface 24 of the guide part 22. Hence, the diffusion of the air flow A2 outward in the vehicle width direction that flows toward the vehicle rear side can be further suppressed.

In addition, the illustrated guide part 22 is configured to have the overhanging part 23 that overhangs substantially in the shape of a right-angled triangle further inward in the vehicle width direction and the vehicle rear side than the vehicle-width-direction inner end part 20A of the flow adjusting member 20, and is configured such that the area of the second flat surface 24B becomes larger. However, the overhanging part 23 may not be formed at the flow adjusting member 20 related to the fifth embodiment.

Sixth Embodiment

A vehicle understructure 10 related to a sixth embodiment will be described. Parts equivalent to those of the first to fifth embodiments will be designated by the same reference signs and the detailed description (including also common operation) thereof will be omitted.

Figure 12:
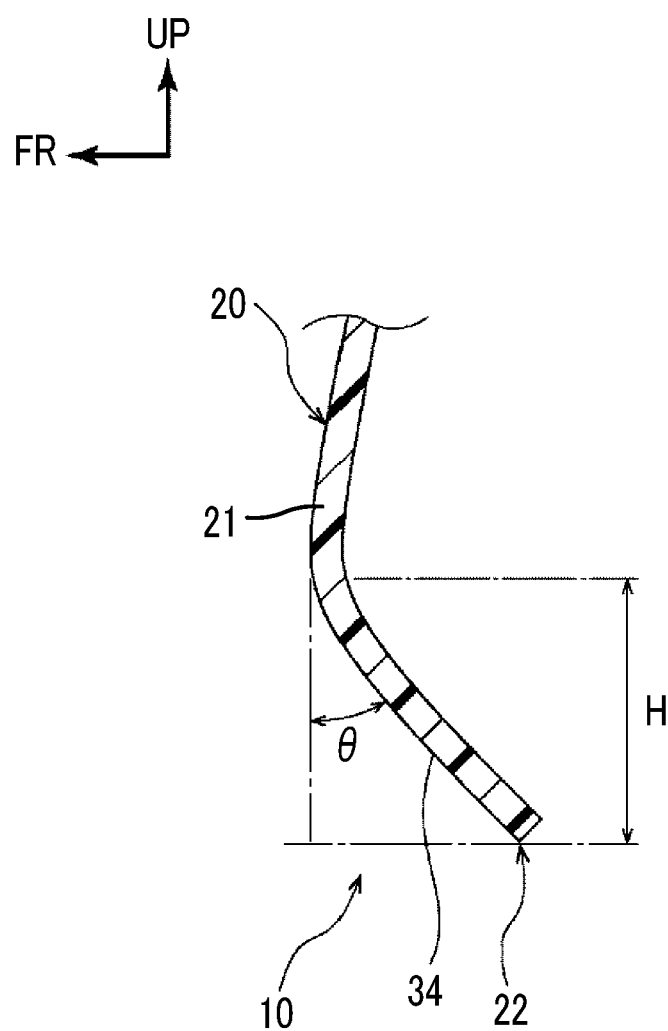
FIG. 12 is a sectional view equivalent to FIG. 4, illustrating the flow adjusting member related to the sixth embodiment.
Figure 13:
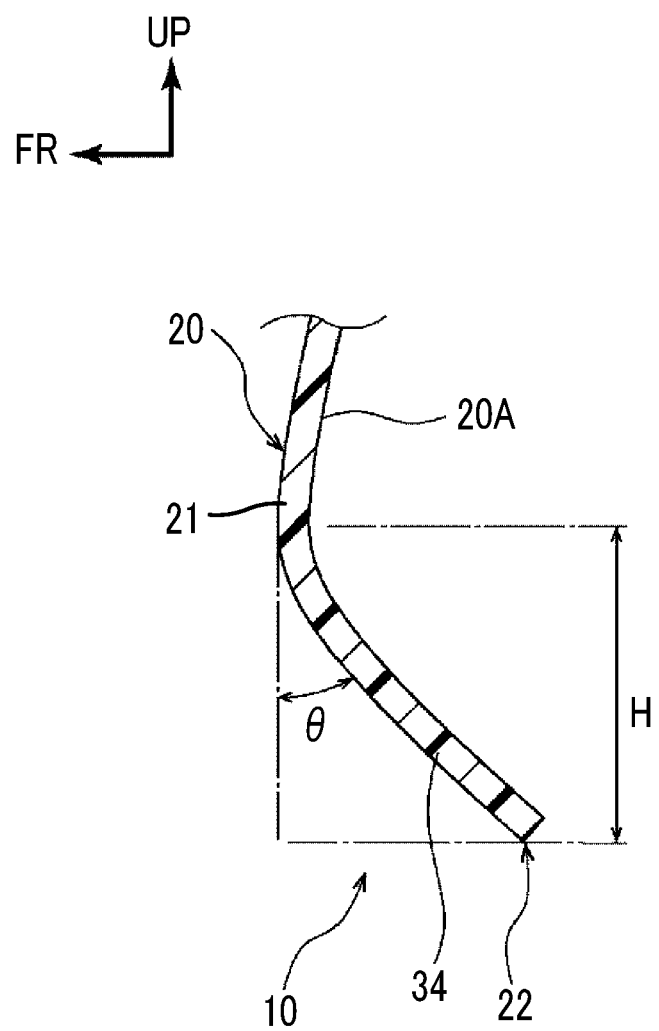
FIG. 13 is a sectional view equivalent to FIG. 5, illustrating the flow adjusting member related to the sixth embodiment.
Figure 14:
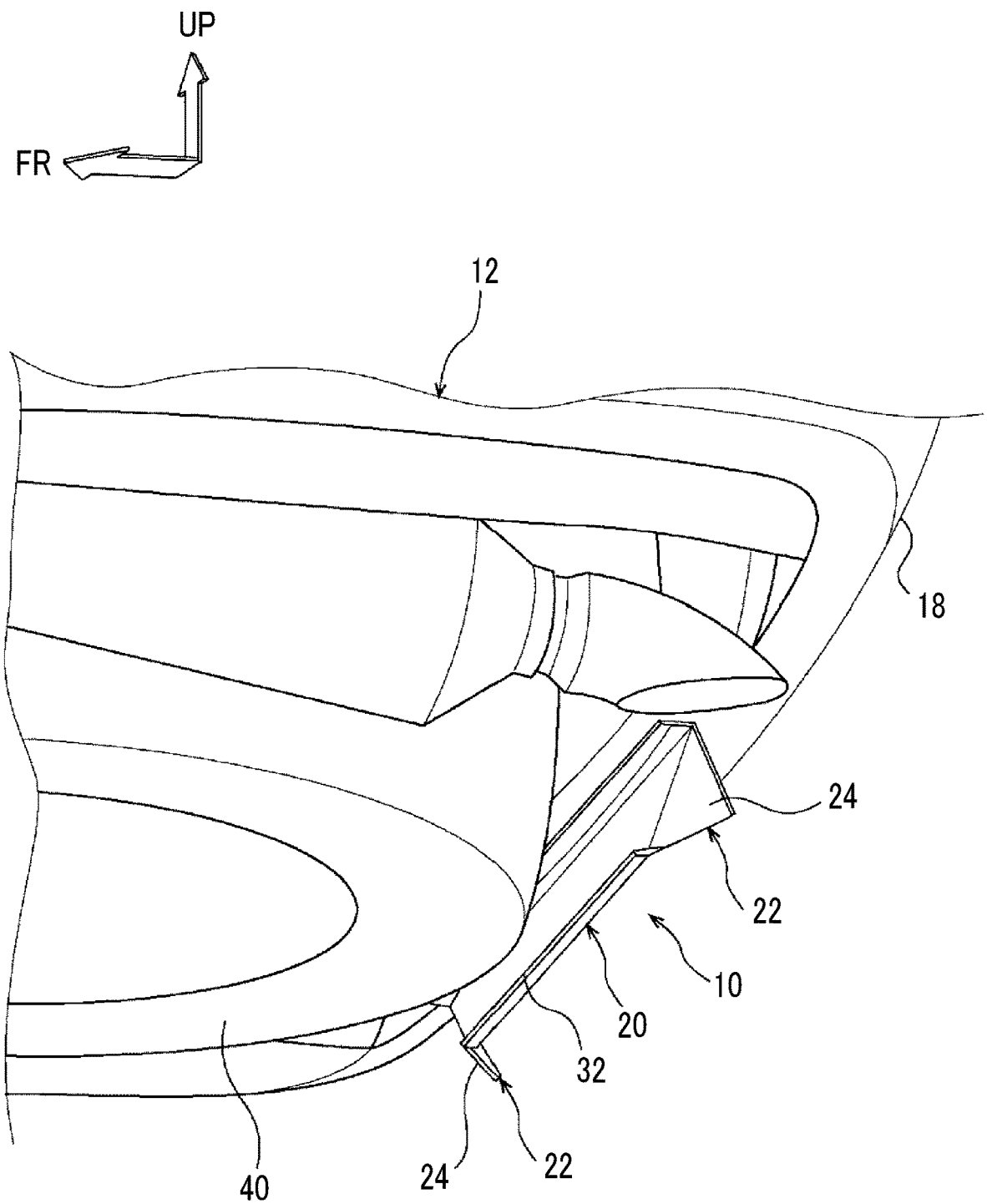
FIG. 14 is a perspective view illustrating a case where a flow adjusting member related to a seventh embodiment is provided rearward of a spare tire.
Figure 15:
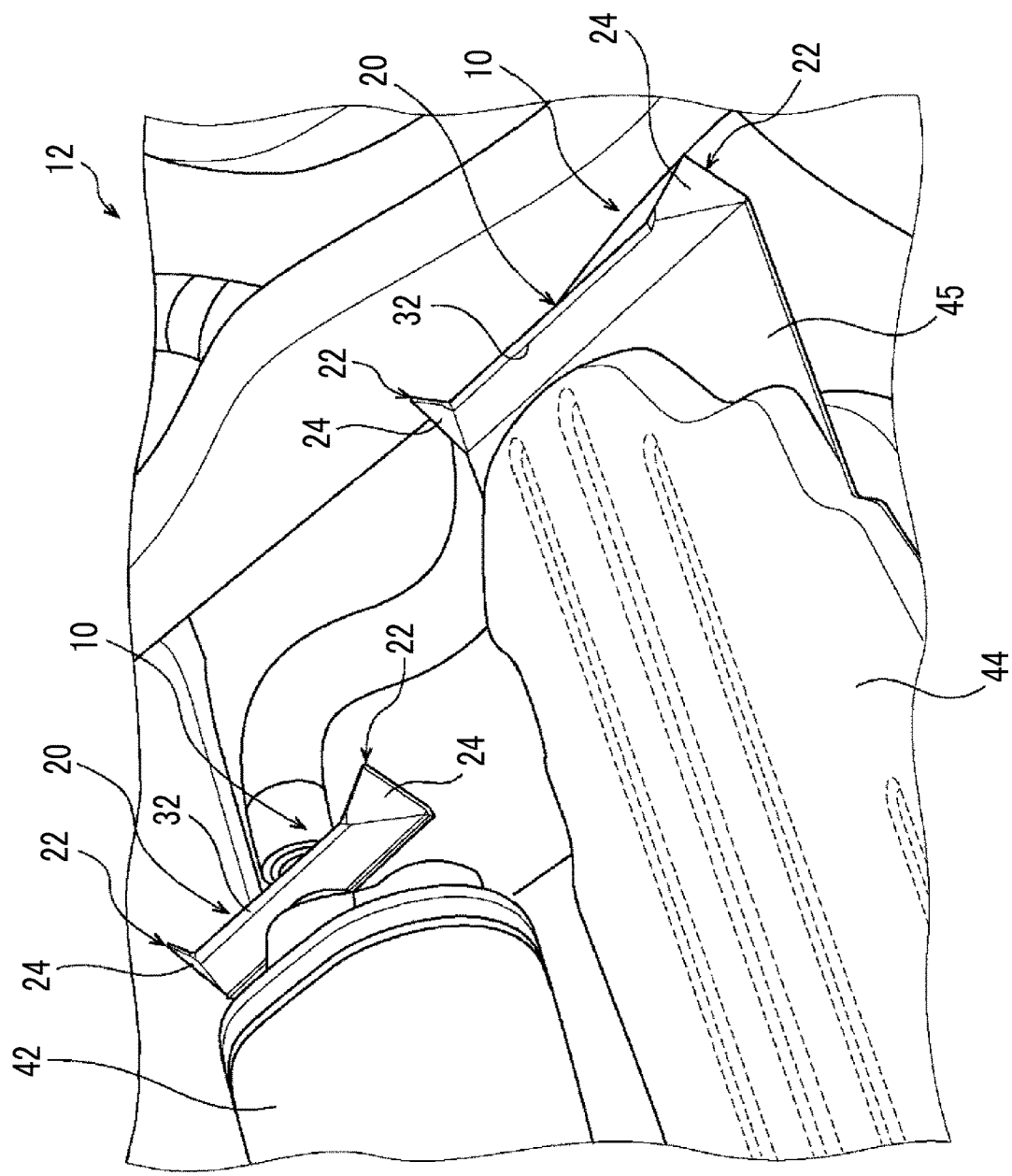
FIG. 15 is a perspective view illustrating a case where the flow adjusting member related to the seventh embodiment is provided rearward of a muffler and a fuel tank.
Figure 16:
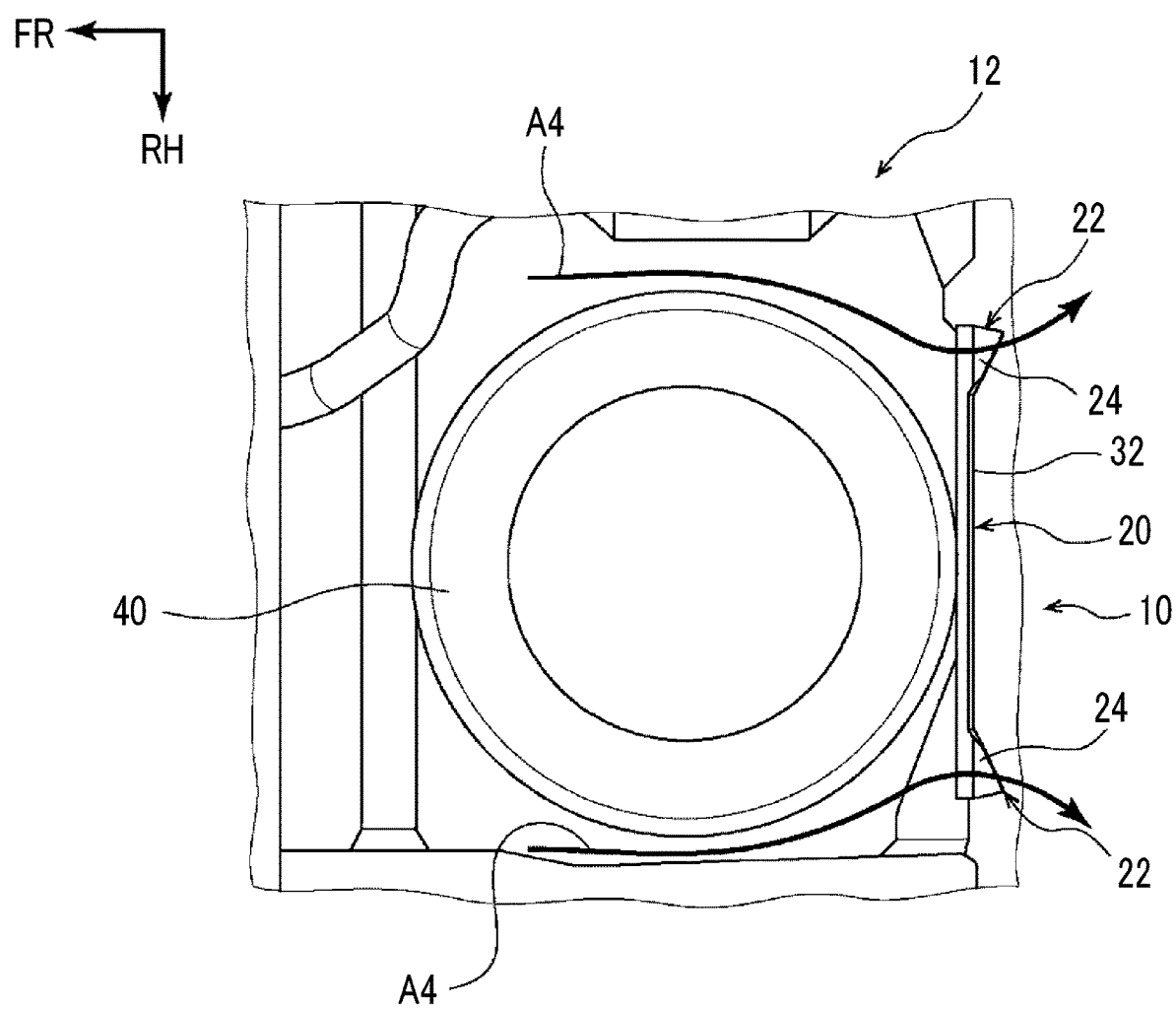
FIG. 16 is a bottom view illustrating a case where the flow adjusting member related to the seventh embodiment is provided rearward of the spare tire.
Figure 17:
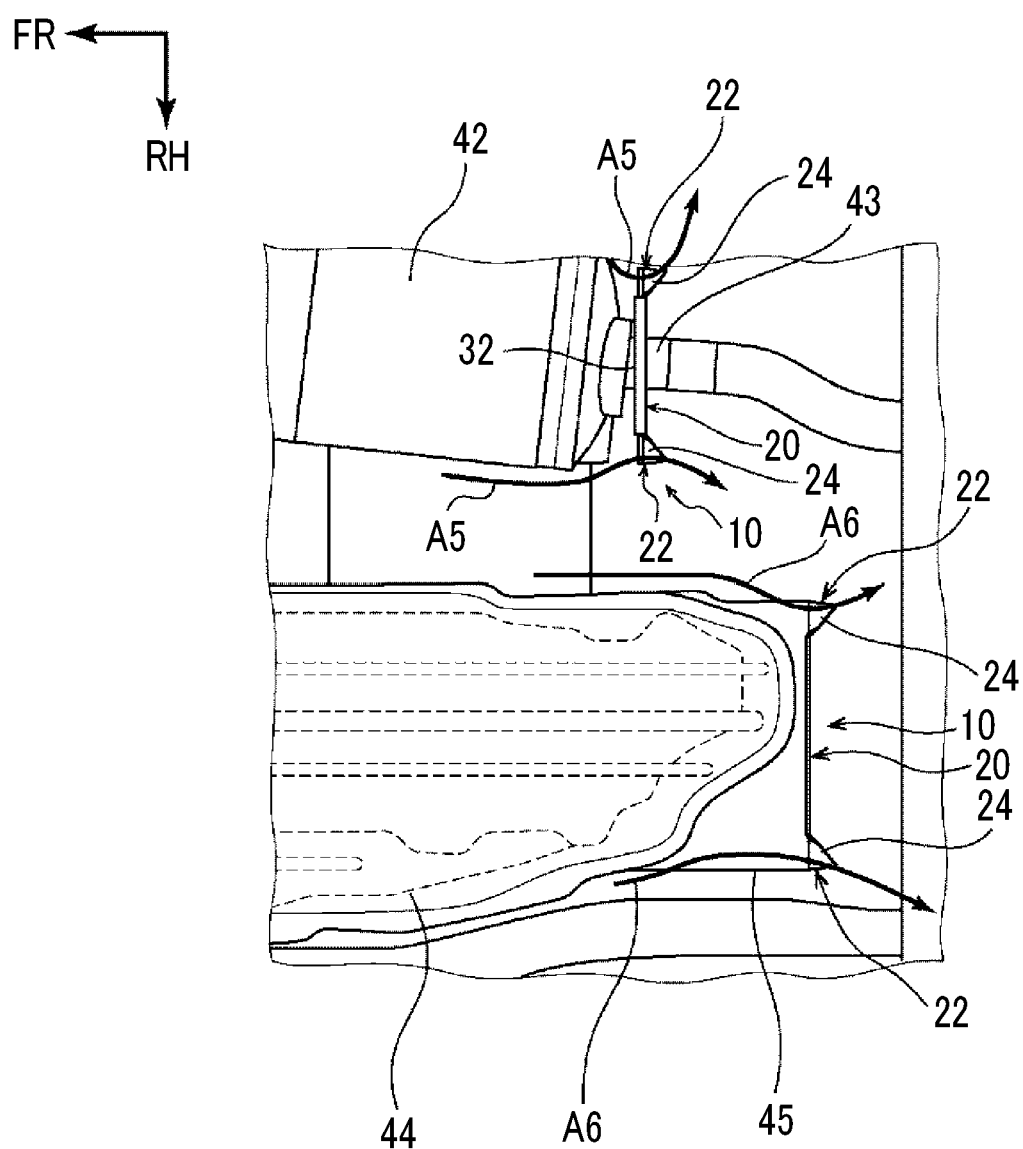
FIG. 17 is a bottom view illustrating a case where the flow adjusting member related to the seventh embodiment is provided rearward of the muffler and the fuel tank.

As illustrated in FIG. 12 and FIG. 13, the guide part 22 of the flow adjusting member 20 related to the sixth embodiment is constituted of a curved surface 34 of which an angle θ (curvature) with respect to the vertical direction becomes gradually greater inward in the vehicle width direction from the outer side in the vehicle width direction in a side view as viewed from the vehicle width direction. Although the illustration of the guide part 22 is omitted because the guide part 22 is similar to that of the above first embodiment, the curved surface 34 is provided such that the height H thereof in the vertical direction becomes gradually higher toward the inner side of the flow adjusting member in the vehicle width direction from the outer side of the flow adjusting member in the vehicle width direction in a front view viewed from the vehicle front-rear direction.

With the flow adjusting member 20 related to the sixth embodiment having the curved surface 34 as mentioned above, the air flow A2 that flows toward the vehicle rear side along the vehicle-width-direction inner end surface 36A of the front wheel 36 more effectively flows toward the vehicle rear side on the inner side of the flow adjusting member in the vehicle width direction along the curved surface 34 of the guide part 22. Hence, the diffusion of the air flow A2 outward in the vehicle width direction that flows toward the vehicle rear side can be further suppressed, and the air flow A2 that flows toward the vehicle rear side can be stabilized.

In addition, even the curved surface 34 as mentioned above may be formed similarly to the second to fifth embodiments. That is, the sub-guide part 26 having the curved surface 34 may be formed above the guide part 22 having the curved surface 34, and the overhanging part 23 may be formed on the curved surface 34. The cutout part 30 may be formed above the curved surface 34, or the maximum height Hm of the curved surface 34 may be made equal to the height Hs in the vehicle-width-direction inner end part 20A of the flow adjusting member 20.

Seventh Embodiment

A vehicle understructure 10 related to a seventh embodiment will be described. Parts equivalent to those of the first to sixth embodiments will be designated by the same reference signs and the detailed description (including also common operation) thereof will be omitted.

As illustrated in FIGS. 14 to 21, guide parts 22 are respectively formed at lower parts (hereinafter referred to as "vehicle-width-direction both-end lower parts") of both end parts of the flow adjusting member 20 related to the seventh embodiment in the vehicle width direction. The guide part 22 of any of the first to sixth embodiments may be applied to the guide part 22 of the seventh embodiment, and the guide part 22 related to the fifth embodiment is applied to the illustration as one example.

Figure 19:
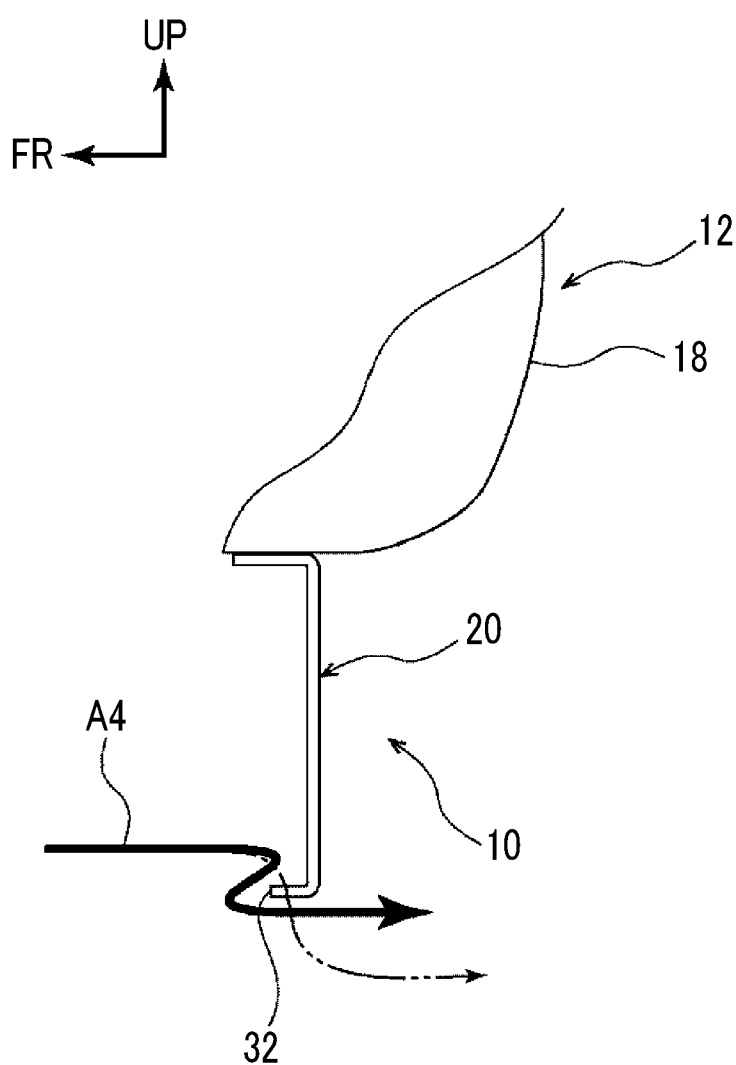
FIG. 19 is an enlarged schematic view illustrating an air flow formed by the flow adjusting member provided rearward of the spare tire.

The flow adjusting member 20 related to the seventh embodiment has a lower end part bent substantially at a right angle toward the vehicle front side (refer to FIG. 19). That is, the bent part 32 that is bent substantially at a right angle toward the vehicle front side in a side view as viewed from the vehicle width direction is integrally formed at the lower end part of the flow adjusting member 20 related to the seventh embodiment. The bent part 32 may be formed at the flow adjusting member 20 in the first to sixth embodiments.

As illustrated also in FIG. 1, the flow adjusting member 20 related to the seventh embodiment having the configuration as described above is attached to the rear side of a spare tire 40, that is, a lower surface of a rear bumper 18, is attached to the rear side of a muffler 42, or is attached to the rear side of a fuel tank 44. That is, in the seventh embodiment, the spare tire 40, the muffler 42, and the fuel tank 44 are examples of protruding members that that protrude further toward the vehicle lower side than a lower surface of the rocker panel 16, the front bumper 17, or the rear bumper 18 in a side view as viewed from the vehicle width direction.

Figure 18:
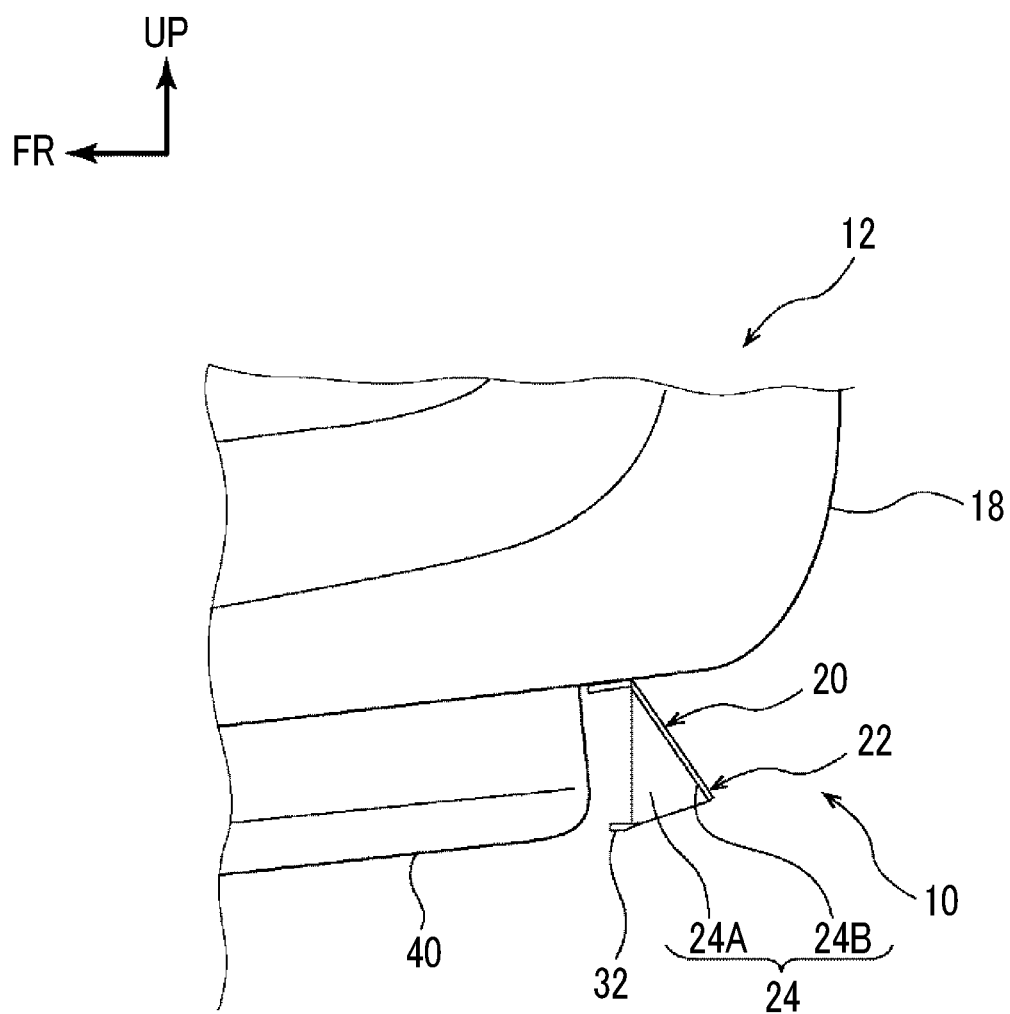
FIG. 18 is a side view illustrating a case where the flow adjusting member related to the seventh embodiment is provided rearward of the spare tire.

As illustrated in FIG. 18, the height position of the lower end part (bent part 32) of the flow adjusting member 20 of which an upper end part is attached to the lower surface of the rear bumper 18 is substantially equal to the height position of the lower surface of the spare tire 40. As described above, the air resistance of the vehicle 12 is further reduced compared to a case where the lower end part of the flow adjusting member 20 protrudes further toward the vehicle lower side than the lower surface of the spare tire 40.

Figure 20:
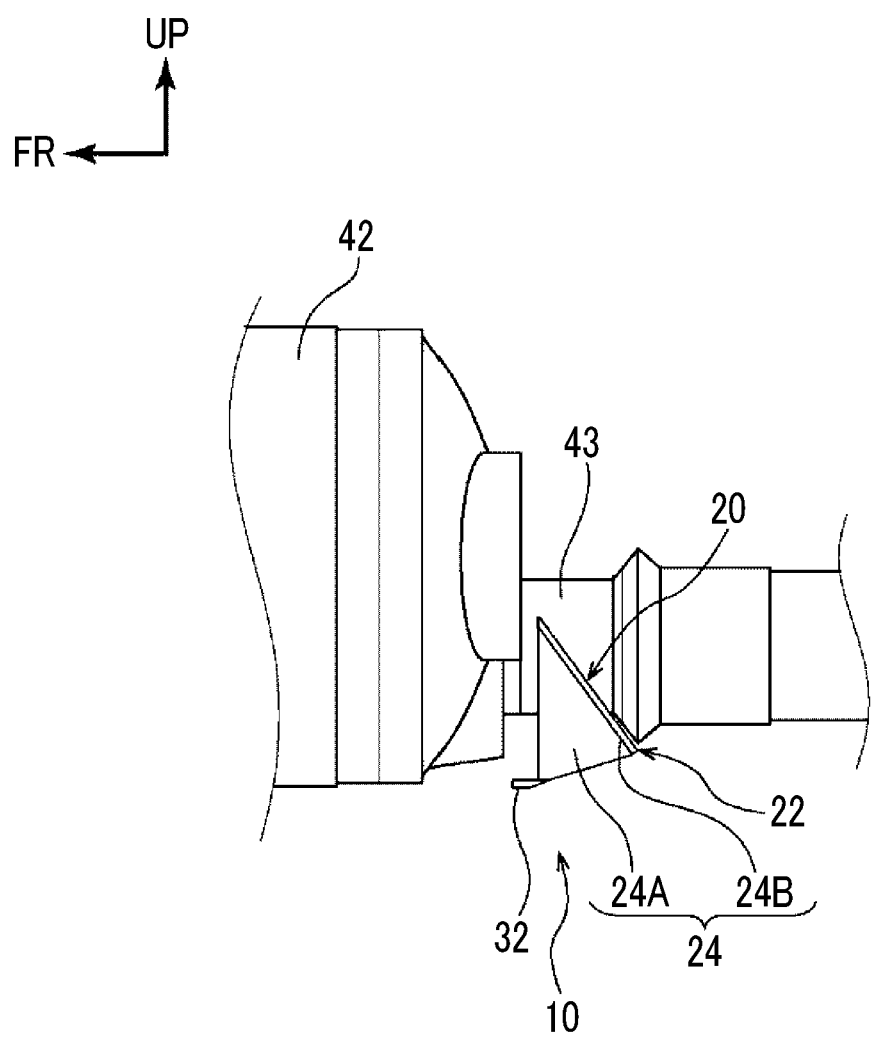
FIG. 20 is a side view illustrating a case where the flow adjusting member related to the seventh embodiment is provided rearward of the muffler.

As illustrated in FIG. 20, the height position of the lower end part (bent part 32) of the flow adjusting member 20 of which the upper end part is attached to the vehicle rear side (for example, a lower end part of an exhaust pipe 43) of the muffler 42 is substantially equal to the height position of the lower surface on a rear end part side of the muffler 42. As described above, the air resistance of the vehicle 12 is further reduced compared to a case where the lower end part of the flow adjusting member 20 protrudes further toward the vehicle lower side than the lower surface of the muffler 42.

Figure 21:
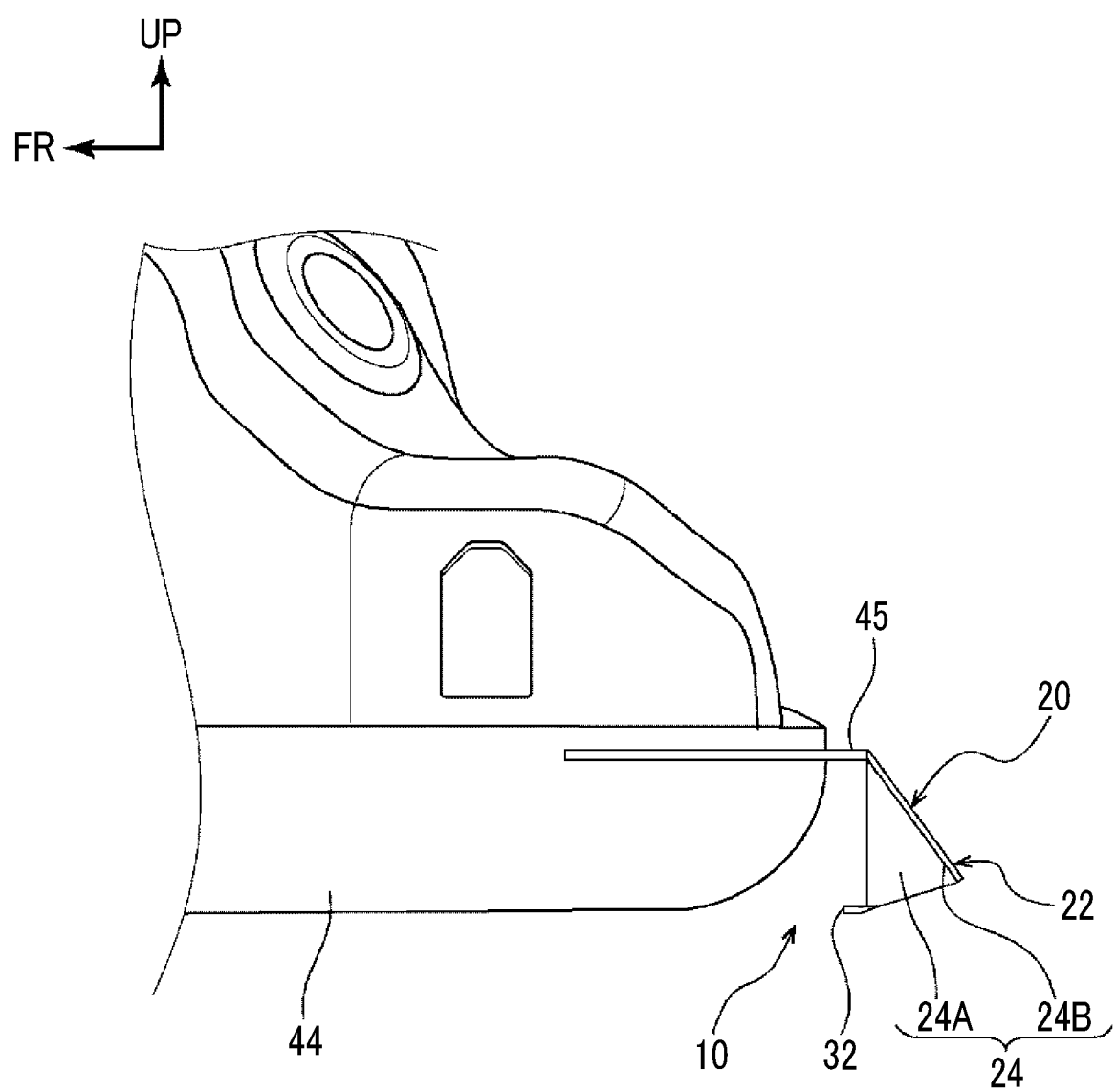
FIG. 21 is a side view illustrating a case where the flow adjusting member related to the seventh embodiment is provided rearward of the fuel tank.

As illustrated in FIG. 21, the height position of the lower end part (bent part 32) of the flow adjusting member 20 of which the upper end part is attached to the vehicle rear side (for example, a rear end part of a flange part 45 extending from the fuel tank 44 toward the vehicle rear side) of the fuel tank 44 is substantially equal to the height position of the lower surface on the rear end part side of the fuel tank 44. As described above, the air resistance of the vehicle 12 is further reduced compared to a case where the lower end part of the flow adjusting member 20 protrudes further toward the vehicle lower side than the lower surface of the fuel tank 44.

Here, the rear side of the spare tire 40 becomes a part where the flow speed of an air flow A4 (refer to FIG. 16) that has flowed from the vehicle front side is slower than the other parts during the traveling of the vehicle 12. Hence, there is a possibility that a portion of the air flow A4 that has flowed toward the vehicle rear side along a surface of the spare tire 40 facing the vehicle width direction flows around to the rear end part side of the spare tire 40, during the traveling of the vehicle 12.

Similarly, the rear side of the muffler 42 and the rear side of the fuel tank 44 become parts where the flow speed of air flows A5, A6 (refer to FIG. 17) that have flowed from the vehicle front side is slower than the other parts during the traveling of the vehicle 12. Hence, there is a possibility that a portion of the air flow A5 that has flowed toward the vehicle rear side along a surface of the muffler 42 facing the vehicle width direction flows around toward the rear end part side of the muffler 42, during the traveling of the vehicle 12, and there is a possibility that a portion of the air flow A6 that has flowed toward the vehicle rear side along a surface of the fuel tank 44 facing the vehicle width direction flows around toward the rear end part side of the fuel tank 44, during the traveling of the vehicle 12.

However, as illustrated in FIGS. 14 to 21, the flow adjusting member 20 having the guide parts 22 at the vehicle-width-direction both-end lower parts, respectively, is disposed on each of the rear side of the spare tire 40, the rear side of the muffler 42, and the rear side of the fuel tank 44. Hence, since the air flows A4, A5, A6 flow toward the vehicle rear side on the vehicle-width-direction both-end part sides along the inclined surfaces 24 of the respective guide parts 22, involvement of a portion of each of the above-described air flows A4, A5, A6 can be suppressed.

Since the bent part 32 bent substantially at a right angle to the vehicle front side is formed at the lower end part of the flow adjusting member 20 related to the seventh embodiment, the air flows A4, A5, A6 are not easily guided toward the vehicle lower side. That is, when the bent part 32 is not formed at the flow adjusting member 20, there is a possibility that a portion of the air flow A4 may flow toward the vehicle lower side, for example, as illustrated by a phantom line in FIG. 19. However, when the bent part 32 is formed at the flow adjusting member 20, a portion of air flow A4 does not easily flow toward the vehicle lower side, for example, as illustrated by a solid line in FIG. 19.

Hence, the diffusion of the air flows A4, A5, A6, which flow toward the vehicle rear side along the surfaces of the spare tire 40, the muffler 42, and the fuel tank 44 facing the vehicle width direction during the traveling of the vehicle 12, toward the vehicle lower side, and the diffusion resulting from the above involvement can be suppressed, and the air flow A4, A5, A6 that flows toward the vehicle rear side can be stabilized.

As described above, although the vehicle understructure 10 related to the present embodiment has been described with reference to the drawings, the vehicle understructure 10 related to the present embodiment are not limited to the illustrated ones. Design changes can be appropriately made without departing from the concept of the disclosure. For example, the inclined surface 24 and the curved surface 34 may satisfy at least one of the above definition of the angle θ (curvature) and the definition of the height H.

As described above, the configurations in the respective embodiments are applicable to each other. For example, guide parts 22 formed as curved surfaces 34 may be formed at the vehicle-width-direction both-end lower parts of the flow adjusting member 20 applied in the seventh embodiment. The protruding members are not limited to the front wheel 36, the rear wheel 38, the spare tire 40, the muffler 42, and the fuel tank 44.

The flow adjusting member 20 provided rearward of the muffler 42 is not limited to the configuration in which the flow adjusting member 20 is provided at the exhaust pipe 43, and may be configured to be directly provided at a rear end part of the muffler 42. Similarly, the flow adjusting member 20 provided rearward of the fuel tank 44 is not limited to the configuration in which the flow adjusting member 20 is provided at the flange part 45, and may be configured to be directly provided at a rear end part of the fuel tank 44.

What is claimed is:

1. A vehicle understructure comprising:
a flow adjusting member disposed rearward of a protruding member that protrudes farther toward a vehicle lower side than a lower surface of a rocker panel, a front bumper, and a rear bumper as viewed from a vehicle width direction, the flow adjusting member being configured to adjust an air flow flowing rearward and along the protruding member as the vehicle is traveling, the flow adjusting member including:
a main part; and
a guide part disposed at a lower part of an inner side of the flow adjusting member with respect to the vehicle width direction, the guide part being inclined toward a vehicle rear side with respect to the main part such that a distance between the guide part and a rear end of the vehicle reduces toward an inner side of the guide part in the vehicle width direction, the guide part including an inclined surface with respect to a vehicle vertical direction (i) whose incline as viewed from the vehicle width direction inclines toward the inner side of the guide part with respect to the vehicle width direction, and (ii) whose height in the vehicle vertical direction increases toward the inner side of the guide part with respect to the vehicle width direction, wherein the main part is a flat plate extending vertically and having a thickness direction that is parallel to a vehicle front-rear direction.

2. The vehicle understructure according to claim 1, wherein the guide part includes an overhanging part extending along the vehicle width direction from the inner side of the flow adjusting member and toward the vehicle rear side from the inner side of the flow adjusting member.

3. The vehicle understructure according to claim 1, wherein:
the flow adjusting member includes a cutout part at an upper part of the inner side of the flow adjusting member; and
the guide part includes an overhanging part that overhangs beyond the cutout part toward the inner side of the flow adjusting member and extends toward the vehicle rear side from the inner side of the flow adjusting member.

4. The vehicle understructure according to claim 1, wherein the flow adjusting member includes a sub-guide part disposed above the guide part in the vehicle vertical direction, the sub-guide part is inclined toward the vehicle rear side so that a distance between the sub-guide part and the rear end of the vehicle reduces toward an inner end part of the sub-guide part in the vehicle width direction.

5. The vehicle understructure according to claim 1, wherein a maximum height of the inclined surface is equal to a height of the inner side of the flow adjusting member.

6. The vehicle understructure according to claim 1, wherein:
the protruding member is one of either a front wheel or a rear wheel;
the flow adjusting member is disposed at a rear lower part of a wheel housing of the protruding member; and
the guide part is disposed on the inner side of the flow adjusting member in the vehicle width direction.

7. The vehicle understructure according to claim 1, wherein:
the protruding member is a spare tire; and
the flow adjusting member is disposed on a lower surface of the rear bumper.

8. The vehicle understructure according to claim 1, wherein:
the protruding member is a muffler; and
the flow adjusting member is disposed rearward of the muffler with respect to the vehicle front-rear direction.

9. The vehicle understructure according to claim 1, wherein:
the protruding member is a fuel tank; and
the flow adjusting member is disposed rearward of the fuel tank with respect to the vehicle front-rear direction.

10. A vehicle understructure comprising:
a flow adjusting member disposed rearward of a protruding member that protrudes farther toward a vehicle lower side than a lower surface of a rocker panel, a front bumper, and a rear bumper as viewed from a vehicle width direction, the flow adjusting member including a main part and being configured to adjust an air flow flowing rearward and along the protruding member as the vehicle is traveling,
wherein a lower part of an inner side of the flow adjusting member in the vehicle width direction includes a guide part configured to guide the air flow toward the inner side of the flow adjusting member, the guide part including a curved surface (i) whose curvature as viewed from the vehicle width direction increases toward the inner side of the flow adjusting member with respect to the vehicle width direction, and (ii) whose height in a vehicle vertical direction increases toward an inner side of the guide part with respect to the vehicle width direction.

11. A vehicle understructure comprising:
a flow adjusting member disposed at a rear lower part of a wheel housing in at least one of a front wheel and a rear wheel, the flow adjusting member including a main part and being configured to adjust an air flow flowing rearward and along the front wheel or the rear wheel from a vehicle front side as the vehicle is traveling,
wherein an inner lower part of the flow adjusting member in a vehicle width direction includes a guide part configured to guide the air flow inward in the vehicle width direction, the guide part including a curved surface (i) whose curvature as viewed from the vehicle width direction increases toward an inner side of the flow adjusting member with respect to the vehicle width direction, and (ii) whose height in a vehicle vertical direction increases toward an inner side of the guide part with respect to a vehicle width direction.

12. The vehicle understructure according to claim 10, wherein the main part is formed as a flat plate extending in the vehicle vertical direction.

13. The vehicle understructure according to claim 11, wherein the main part is formed as a flat plate extending in the vehicle vertical direction.

* * * * *